US010880850B2

(12) United States Patent
Centonza et al.

(10) Patent No.: US 10,880,850 B2
(45) Date of Patent: Dec. 29, 2020

(54) ACCURATE OVER THE AIR SYNCHRONIZATION

(71) Applicant: Telefonaktiebolaget LM Ericsson (publ), Stockholm (SE)

(72) Inventors: Angelo Centonza, Stockholm (SE); Magnus Sandgren, Staffanstorp (SE); Chunhui Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 15/037,016

(22) PCT Filed: Mar. 30, 2016

(86) PCT No.: PCT/SE2016/050262
§ 371 (c)(1),
(2) Date: May 16, 2016

(87) PCT Pub. No.: WO2016/159864
PCT Pub. Date: Oct. 6, 2016

(65) Prior Publication Data
US 2017/0142674 A1 May 18, 2017

Related U.S. Application Data

(60) Provisional application No. 62/140,713, filed on Mar. 31, 2015.

(51) Int. Cl.
*H04W 56/00* (2009.01)
*H04L 5/00* (2006.01)
(Continued)

(52) U.S. Cl.
CPC ......... *H04W 56/004* (2013.01); *H04L 5/0048* (2013.01); *H04W 24/02* (2013.01);
(Continued)

(58) Field of Classification Search
CPC ........ H04L 5/00; H04W 24/02; H04W 64/00; H04W 56/00
See application file for complete search history.

(56) References Cited

U.S. PATENT DOCUMENTS 8,810,452 B2 8/2014 Bull
2005/0053099 A1* 3/2005 Spear ................... G01S 5/0009
370/508

(Continued)

FOREIGN PATENT DOCUMENTS

EP 2173130 A1 4/2010
WO 2007117186 A1 10/2007
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.5.0, Mar. 2015, 1-251.
(Continued)

*Primary Examiner* — Anez C Ebrahim
(74) *Attorney, Agent, or Firm* — Murphy, Bilak & Homiller, PLLC

(57) ABSTRACT

In one aspect, a first device determines transmitter location information indicating a location for each of one or more transmitters that provide synchronization signals. The first device inserts the transmitter location information in a time synchronization IE and transmits the time synchronization IE to a second device. The second device receives the transmitter location information from the first device and determines one or more propagation delays of a synchronization signal received from a transmitter based on the transmitter location information received for the transmitter in the IE. The second device uses the determined one or
(Continued)

more propagation delays to compensate for a timing difference between the first device and a transmitter of the synchronization signal.

24 Claims, 22 Drawing Sheets

(51) Int. Cl.
  *H04W 24/02* (2009.01)
  *H04W 64/00* (2009.01)
  *H04W 84/18* (2009.01)
(52) U.S. Cl.
  CPC ..... *H04W 56/006* (2013.01); *H04W 56/0025* (2013.01); *H04W 64/003* (2013.01); *H04W 84/18* (2013.01)

(56) References Cited

U.S. PATENT DOCUMENTS

| | | | |
|---|---|---|---|
| 2006/0089152 A1* | 4/2006 | Mahonen | H04L 67/1095 455/456.1 |
| 2009/0028088 A1* | 1/2009 | Kangas | G01S 5/0036 370/326 |
| 2009/0245227 A1* | 10/2009 | Chin | H04B 7/2681 370/350 |
| 2011/0140881 A1* | 6/2011 | Kim | H04M 3/42348 340/539.13 |
| 2011/0216757 A1* | 9/2011 | Michel | H04J 3/0679 370/350 |
| 2012/0157117 A1* | 6/2012 | Choi | H04W 4/029 455/456.1 |
| 2013/0107802 A1 | 5/2013 | Lee et al. | |
| 2013/0324154 A1 | 12/2013 | Raghupathy et al. | |
| 2014/0241244 A1 | 8/2014 | Traore et al. | |
| 2014/0331329 A1 | 11/2014 | Edge et al. | |

FOREIGN PATENT DOCUMENTS

| | | |
|---|---|---|
| WO | 2012032724 A1 | 3/2012 |
| WO | 2012106798 A1 | 8/2012 |
| WO | 2013063272 A1 | 5/2013 |

OTHER PUBLICATIONS

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.6.0, Dec. 2014, 1-992.
3GPP, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 13)", 3GPP TR 36.922 V13. 0.0, Jan. 2016, 1-74.
3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.4.0, Dec. 2014, 1-300.
3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.5.0, Mar. 2015, 1-301.
3GPP, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.4.2, Dec. 2014, 1-204.
3GPP, "3rd Generation Partnership Project; Technical Specification Group Radio Access Network; Network Assistance for Network Synchronization (Release 13)", 3GPP TR 36.898 V1.0.0, Dec. 2015, 1-15.
3GPP, "3rd Generation Partnership Project; Technical Specification Group Services and System Aspects; Telecommunication management; Home enhanced Node B (HeNB) Operations, Administration, Maintenance and Provisioning (OAM&P).", 3GPP TS 32.592 V13. 0.0, Dec. 2014, 1-94.
3GPP, "3rd Generation Partnership Project; Technical Specification Group Services and System Aspects; Telecommunication management; Inventory Management (IM) Network Resource Model (NRM) Integration Reference Point (IRP); Information Service (IS) (Release 12)", 3GPP TS 28.632 V12.0.1, Oct. 2014, 1-25.
ETSI, "LTE; Evolved Universal Terrestrial Radio Access (E-UTRA); Requirements for support of radio resource management (3GPP TS 36.133 version 12.6.0 Release 12)", ETSI TS 136 133 V12.6.0, Apr. 2015, 1-993.
ETSI, "LTE; Evolved Universal Terrestrial Radio Access Network (E-UTRAN); X2 Application Protocol (X2AP) (3GPP TS 36.423 version 12.4.2 Release 12)", ETSI TS 136 423 V12.4.2, Feb. 2015, 1-205.
ETSI, "Universal Mobile Telecommunications System (UMTS); LTE; Telecommunication management; Inventory Management (IM) Network Resource Model (NRM) Integration Reference Point (IRP); Information Service (IS) (3GPP TS 28.632 version 12.0.1 Release 12)", ETSI TS 128 632 V12.0.1, Oct. 2014, 1-27.
Unknown, Author, "TR 36.898, v0.5.0", Huawei, 3GPP TSG-RAN3 Meeting #90, R3-152900, Anaheim CA, USA, Nov. 16-20, 2015, 1-16.

* cited by examiner

| IE/Group Name | Presence | Range | IE type and reference | Semantics description |
|---|---|---|---|---|
| Synchronization Info | | | | |
| >Stratum Level | M | | INTEGER (0..3, ...) | |
| >Synchronization status | M | | ENUMERATED(Synchronous, Asynchronous, ...) | |
| >Muting Availability Indication | O | | ENUMERATED (Available, Unavailable, ...) | indicates availability of muting activation |
| Transmission Point Location Information | O | 1..<maxnoofTransmissionPoints> | | indicates a list of transmission point location information and the cells associated to each transmission point |
| >Latitude | M | | ENUMERATED | |
| >Longitude | M | | ENUMERATED | |
| >Elevation | M | | ENUMERATED | |
| >E-CGI List | O | 1..<maxnoofECGIs> | | List of cells served by the transmission point |
| >>E-CGI | M | | | E-CGI of cell included in the list |

FIG. 11

| IE/Group Name | Presence | Range | IE type and reference | Semantics description | Criticality | Assigned Criticality |
|---|---|---|---|---|---|---|
| PCI | M | | INTEGER (0..503,...) | Physical Cell ID | – | – |
| Cell ID | M | | ECGI 9.2.14 | | – | – |
| TAC | M | | OCTET STRING(2) | Tracking Area Code | – | – |
| Broadcast PLMNs | M | 1..<maxnoofBPLMNs> | | Broadcast PLMNs | – | – |
| >PLMN Identity | M | | 9.2.4 | | | |
| Transmission point Location | O | | | | | |

| IE/Group Name | Presence | Range | IE type and reference | Semantics description | Criticality | Assigned Criticality |
|---|---|---|---|---|---|---|
| PCI | M | | INTEGER (0..503...) | Physical Cell ID | – | – |
| Cell ID | M | | ECGI 9.2.14 | | – | – |
| TAC | M | | OCTET STRING(2) | Tracking Area Code | – | – |
| Broadcast PLMNs | M | 1..<maxnoofBPLMNs> | | Broadcast PLMNs | – | – |
| >PLMN Identity | M | | 9.2.4 | | – | – |
| Transmission point Location | O | | | | | |
| Multipoint Transmission | O | | ENUMERATED (true,...) | Indicates whether the cell's channels are transmitted by multiple points | | |

FIG. 17

ACCURATE OVER THE AIR SYNCHRONIZATION

TECHNICAL FIELD

The present invention generally relates to wireless communication networks, and particularly relates to synchronization information for wireless devices.

BACKGROUND

LTE 3GPP Long Term Evolution (LTE) technology is a mobile broadband wireless communication technology in which transmissions from base stations (referred to as eNodeBs or eNBs) to mobile stations (referred to as user equipment or UE) are sent using orthogonal frequency division multiplexing (OFDM). OFDM splits the signal into multiple parallel sub-carriers in frequency. The basic unit of transmission in LTE is a resource block (RB), which in its most common configuration consists of 12 subcarriers and 7 OFDM symbols (one slot). A unit of one subcarrier and 1 OFDM symbol is referred to as a resource element (RE), as shown in FIG. 1. Thus, an RB consists of 84 REs. An LTE radio subframe is composed of two slots in time and multiple resource blocks in frequency with the number of RBs determining the bandwidth of the system (see FIG. 2). Furthermore, the two RBs in a subframe that are adjacent in time are denoted as an RB pair. Currently, LTE supports standard bandwidth sizes of 6, 15, 25, 50, 75 and 100 RB pairs. In the time domain, LTE downlink transmissions are organized into radio frames of 10 ms, each radio frame consisting of ten equally-sized subframes of length $T_{subframe}=1$ ms.

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on reference symbols (RS) that are transmitted on the downlink. These reference symbols and their position in the time-frequency grid are known to the UE and hence can be used to determine channel estimates by measuring the effect of the radio channel on these symbols. In Rel-11 and prior releases of LTE, there are multiple types of reference symbols. The common reference symbols are used for channel estimation during demodulation of control and data messages in addition to synchronization. The common reference symbols occur once every subframe.

Heterogeneous networks, where the macro cells and the small cells have vastly different transmit powers, may be deployed in two main ways. In the first deployment type, the small cell layer and the macro cell layer send the same carrier frequencies, which creates interference between the two layers. In the second deployment type, the small cell layer and macro cell layer are on separate frequencies.

The network architecture for LTE allows messages to be sent between eNBs via an X2 interface. The eNB also can communicate with other nodes in the network, e.g., to the Mobility Management Entity (MME) via the S1 interface.

In a current specification, methods are specified that allow some self-organizing network (SON) functionality where an eNB can request information regarding another eNB via the MME. In FIG. 3, the architecture involving E-UTRAN the radio access network (RAN) and the core network (CN) is shown.

Currently, network interface based signaling for over the air synchronization purposes is enabled by means of the S1: eNB Configuration Transfer and S1: MME Configuration Transfer procedures according to the steps outlined in FIG. 4.

FIG. 4 shows S1 signaling to support radio interface based synchronization. At a first step, an eNB1 402 generates an eNB Configuration Transfer message containing a SON Information Transfer information element (IE) with a SON Information Request IE set to "Time synchronization Info." At a second step, the MME 404 receiving the eNB Configuration Transfer message forwards the SON Information Transfer IE towards a target eNB2 406 indicated in the IE by means of the MME 404 Configuration Transfer message. Another eNB3 408 may also receive a message.

At a third step, the receiving eNB2 406 may reply with an eNB Configuration Transfer message towards the eNB1 402 including a SON Information Reply IE with the Timing Synchronization Information IE, which consists of a Stratum Level and a Synchronization Status of the sending node (additionally the message can include information about availability of the muting function and details of already active muting patterns). These two parameters can be defined as follows:

Stratum Level: indicates the number of hops between the node to which the stratum level belongs to the source of a synchronized reference clock. That is, when the stratum level is M, the eNB is synchronized to an eNB whose stratum level is M−1, which in turn is synchronized to an eNB with stratum level M−2 and so on. The eNB with stratum level 0 is the synchronization source.

Synchronization Status: indicates whether the node signaling such parameter is connected (via the number of hops stated in the Stratum Level) to a synchronized reference clock (e.g., a GPS source) or to a non-synchronized reference clock (e.g., a drifting clock).

At a fourth step, the MME 404 receiving the eNB Configuration Transfer message from the eNB2 406 forwards it to the eNB1 402 by means of the MME Configuration Transfer message. At a fifth step, eNB1 402 selects the best available cell's signal as a synchronization source and identifies whether there are neighbor cells interfering with the synchronization source signal. If such interfering cells are identified, e.g. in the eNB2's 406 cells, the eNB1 402 sends an eNB Configuration Transfer including information about the cell selected as the synchronization source as well as a request to activate muting on certain specific cells. The information on the synchronization source cell may consist of the synchronization RS period, an offset, and the synchronization node's stratum level.

At a sixth step, the MME 404 receiving the eNB Configuration Transfer message from the eNB1 402 forwards it to the NB2 406 by means of the MME Configuration Transfer message. At a seventh step, the eNB2 406 determines whether the muting request from the eNB1 402 can be fulfilled and activates muting patterns that are most suitable to such request. The eNB2 406 responds with an eNB Configuration Transfer message containing muting pattern information such as muting pattern period (period of muted subframes) and muting pattern offset.

At an eighth step, the MME receiving the eNB Configuration Transfer message from the eNB2 406 forwards it to the eNB1 402 by means of the MME Configuration Transfer message. At a ninth step, if the eNB1 402 determines that muting at the eNB2's 406 cells is no more needed, the eNB1 402 can trigger an eNB Configuration Transfer message containing a muting deactivation request.

At a tenth step, the MME 404 receiving the eNB Configuration Transfer message from the eNB1 402 forwards it to the eNB2 406 by means of the MME Configuration Transfer message. The eNB2 406 may then deactivate the muting pattern, i.e., it may freely transmit on the subframes previously muted.

It shall be noted that the Radio Interface Based Synchronization (RIBS) functions are standardized in 3GPP Release 12 and pattern muting activation should enable an enhancement of the synchronization source signal with respect to the case where interference from aggressor cells is not mitigated.

FIG. 5 shows a management system 500 according to an operations, administration, and maintenance/management (OAM) architecture. The node elements (NE) 508, 510, such as eNodeBs 402 and 404, are managed by a domain manager (DM) 504, 506, also referred to as the operation and support system (OSS). A DM 504, 506 may further be managed by a network manager (NM) 502. Two NEs 508, 510 are interfaced by X2, whereas the interface between two DMs 504, 506 is referred to as Itf-P2P. The management system may configure the network elements, as well as receive observations associated to features in the network elements. For example, a DM 504 observes and configures the NEs 508, 510, while the NM 502 observes and configures the DM 504, as well as an NE 508 via the DM 504. By means of configuration via the DM 504, the NM 502 and related interfaces, functions over the X2 and S1 interfaces can be carried out in a coordinated way throughout the RAN, eventually involving the Core Network, i.e., MME and S-GWs.

SUMMARY

Embodiments of the present invention comprise apparatuses and methods for sending synchronization information and performing more accurate synchronization. In some embodiments, a first device in a wireless communication network sends synchronization information to other devices in the wireless communication network. For example, the first device determines transmission point location information indicating a location for each transmission point that provides synchronization signals and inserts the transmission point location information in a time synchronization information element (IE). The time synchronization IE is transmitted to at least one other device. Note that the term "transmission point" is used in the embodiments, but a transmission point may also be considered a "transmitter" and the terms will be used interchangeably at times for clarity.

According to some embodiments, a method, in a first device in a wireless communication network, for receiving synchronization information from a second device in the wireless communication network includes receiving transmitter location information, from the second device, in an IE indicating a location for each of one or more transmitters that provide synchronization signals, determining one or more propagation delays of a synchronization signal received from a transmitter based on transmitter location information received for the transmitter in the IE, and using the determined one or more propagation delays to compensate for a timing difference between the first device and a transmitter of the synchronization signal.

According to some embodiments, a method, in a first device in a wireless communication network, for sending synchronization information to other devices in the wireless communication network includes determining transmitter location information indicating a location for each of one or more transmitters that provide synchronization signals and inserting, in a time synchronization IE, location information for a transmitter associated with one or more cells, the location information indicating two or more transmitter locations for the transmitter. The method also includes transmitting the time synchronization IE to at least the second device.

According to some embodiments, a network device in a wireless communication network, configured to receive synchronization information from another device in the wireless communication network, includes a processing circuit configured to receive transmitter location information from the other device in an IE, indicating a location for each of one or more transmitters that provide synchronization signals. The processing circuit is also configured to determine one or more propagation delays of a synchronization signal received from a transmitter based on transmitter location information received for the transmitter in the IE, and use the determined one or more propagation delays to compensate for a timing difference between the network device and a transmitter of the synchronization signal.

According to some embodiments, a network device in a wireless communication network, configured to send synchronization information to other devices in the wireless communication network, includes a processing circuit configured to determine transmitter location information indicating a location for each of one or more transmitters that provide synchronization signals, insert the transmitter location information in a time synchronization IE, and transmit the time synchronization IE to at least one other device.

The methods may also be implemented by apparatuses, network nodes, network access nodes, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 11 illustrates an example of enhancements to a time synchronization Information IE signaled over the S1 interface, according to some embodiments.

FIG. 15 illustrates an example of enhancements to a Served Cell Information IE, according to some embodiments.

FIG. 17 illustrates an example of an addition of a multi-point transmission indication to the Served Cell Information IE, according to some embodiments.

DETAILED DESCRIPTION

Figure 1:
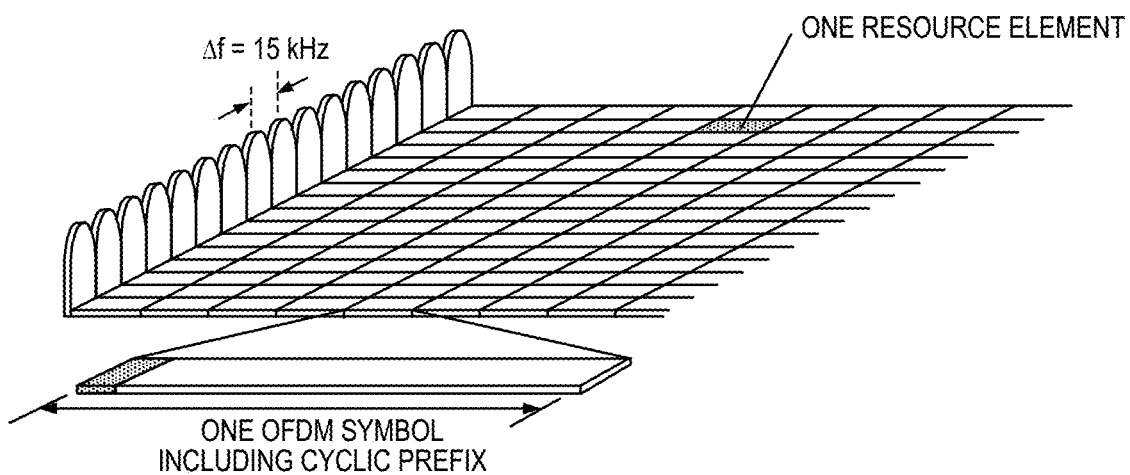
FIG. 1 is a diagram illustrating an LTE downlink physical resource.
Figure 2:
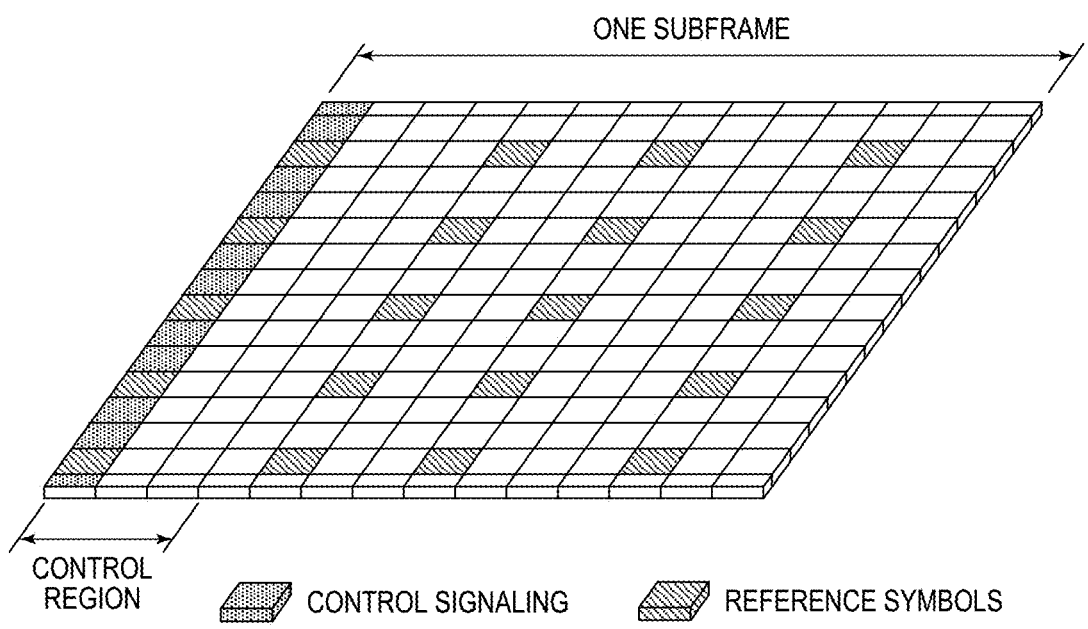
FIG. 2 is a diagram illustrating a downlink subframe.
Figure 3:
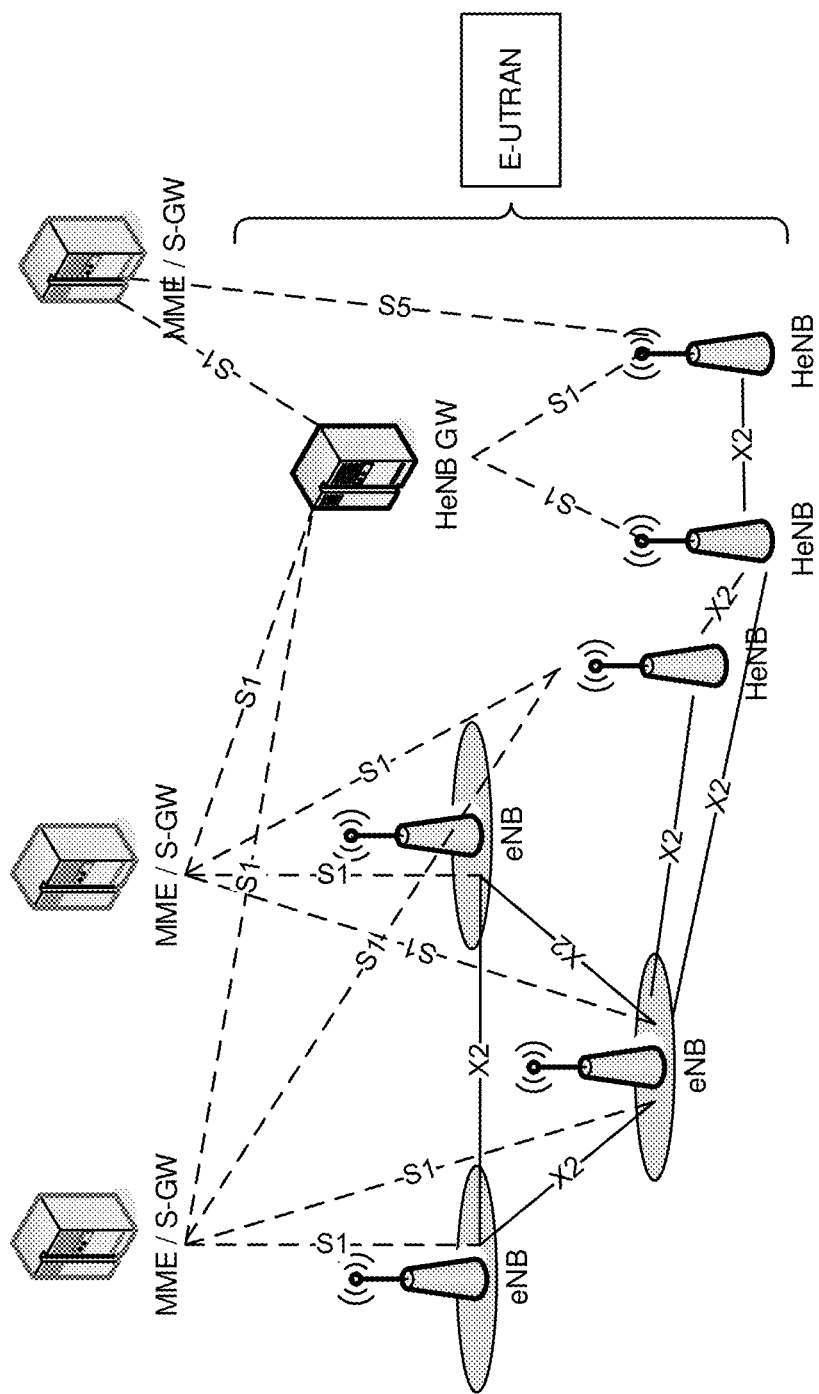
FIG. 3 is a diagram illustrating an LTE Architecture diagram.
Figure 4:
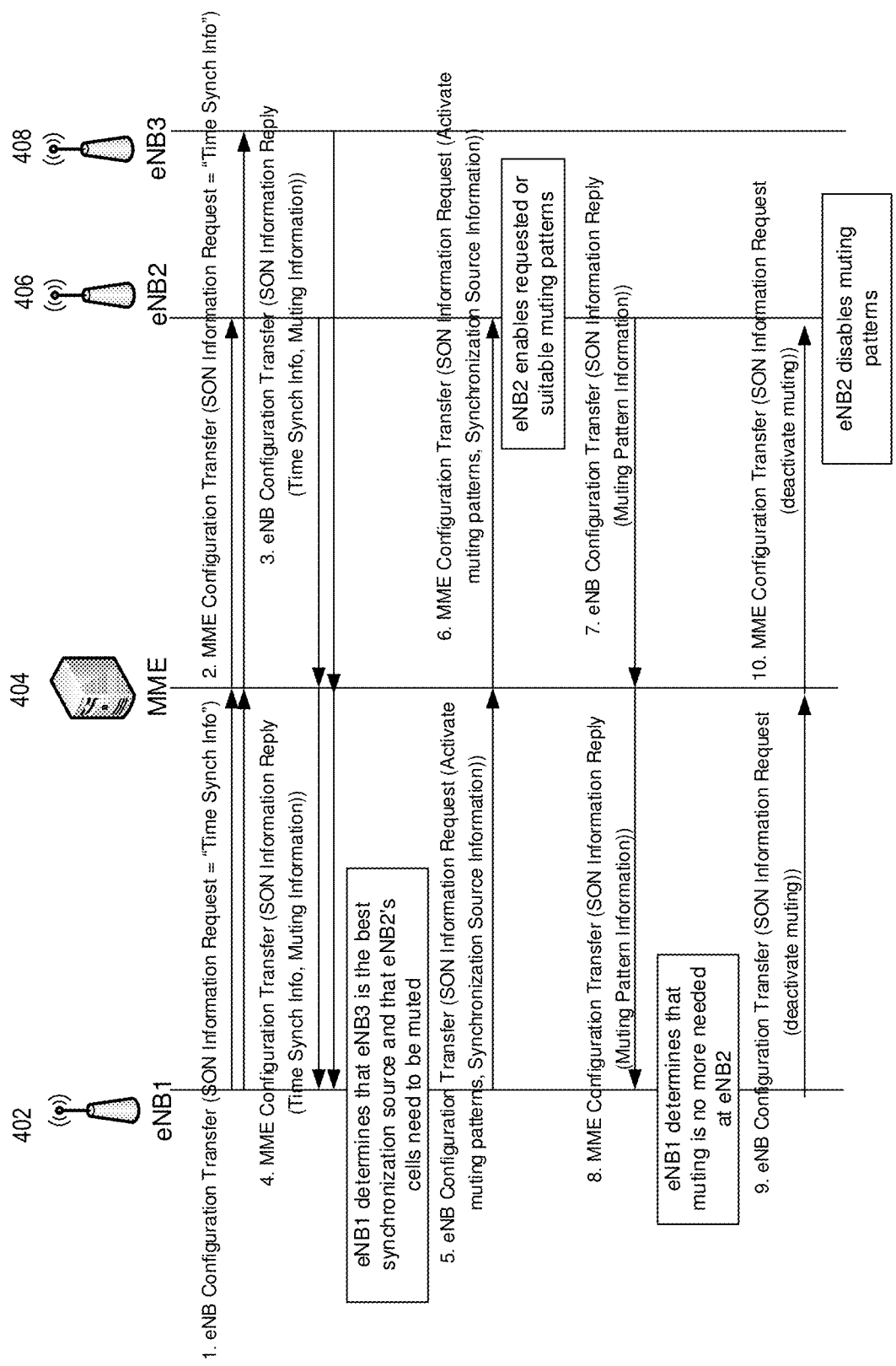
FIG. 4 is a diagram illustrating S1 signaling to support radio interface based synchronization.
Figure 5:
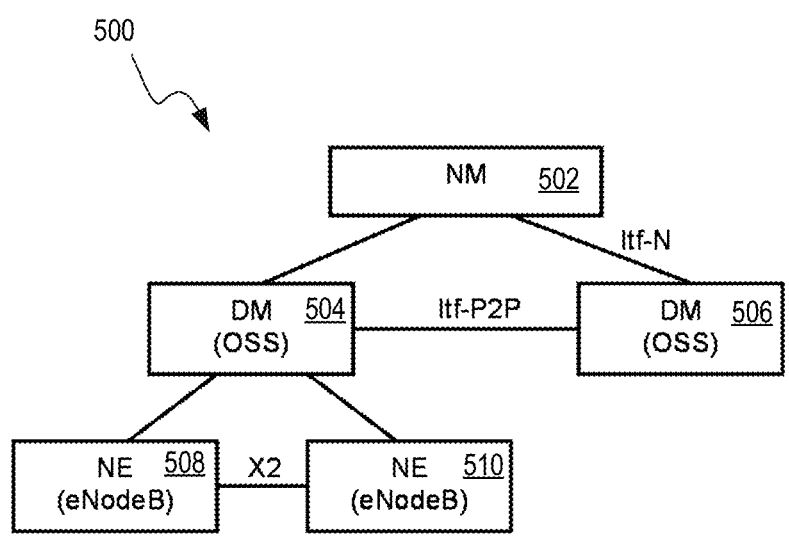
FIG. 5 is a diagram illustrating a management system architecture.

It is recognized herein that the system outlined in FIG. 5 does not allow synchronization source signal propagation delays to be taken into account at the synchronization target node in order to achieve an accurate synchronization to the source signal. Currently, it is possible to configure an eNB with the position of its own antennae. However, it is not possible for an eNB to determine the position and position accuracy of a transmission point from which timing information has been acquired. For example, if an eNB needing synchronization detected a number of cells in its neighborhood and if the procedures described in FIG. 4 to acquire Time Synchronization Information were carried out, the eNB may determine the best cell for synchronization. This may be followed by muting requests towards nearby aggressors. However, because the distance to the cell is not known to the eNB receiving the synchronization signal, such a procedure may not lead to good synchronization results if the location of the transmission point sending the synchronization source signal is unknown.

Indeed, current synchronization requirements for Time Domain Division (TDD) systems allow for a synchronization margin of up to 3 us between cells in a given neighborhood. Moreover, functions for interference cancelation and interference coordination such as eICIC (enhanced Interference Cancelation and Interference Coordination) benefit from synchronization margins within of 1 us between cells in a given neighborhood. Such synchronization accuracy is not achievable by means of the current RIBS function due to the lack of knowledge of the synchronization source transmission point. Therefore, a synchronization target eNB received from, for example, 500 m away from the synchronization source transmission point would already be subject to a synchronization error equal to the propagation delay from source to target. That is, the propagation delay is equal to the distance from source to target/speed of light, which for a distance of 500 m equals ~1.66 us. Such a mismatch would not meet TDD synchronization requirements and would imply malfunction of functions that require more accurate synchronization.

Figure 6:
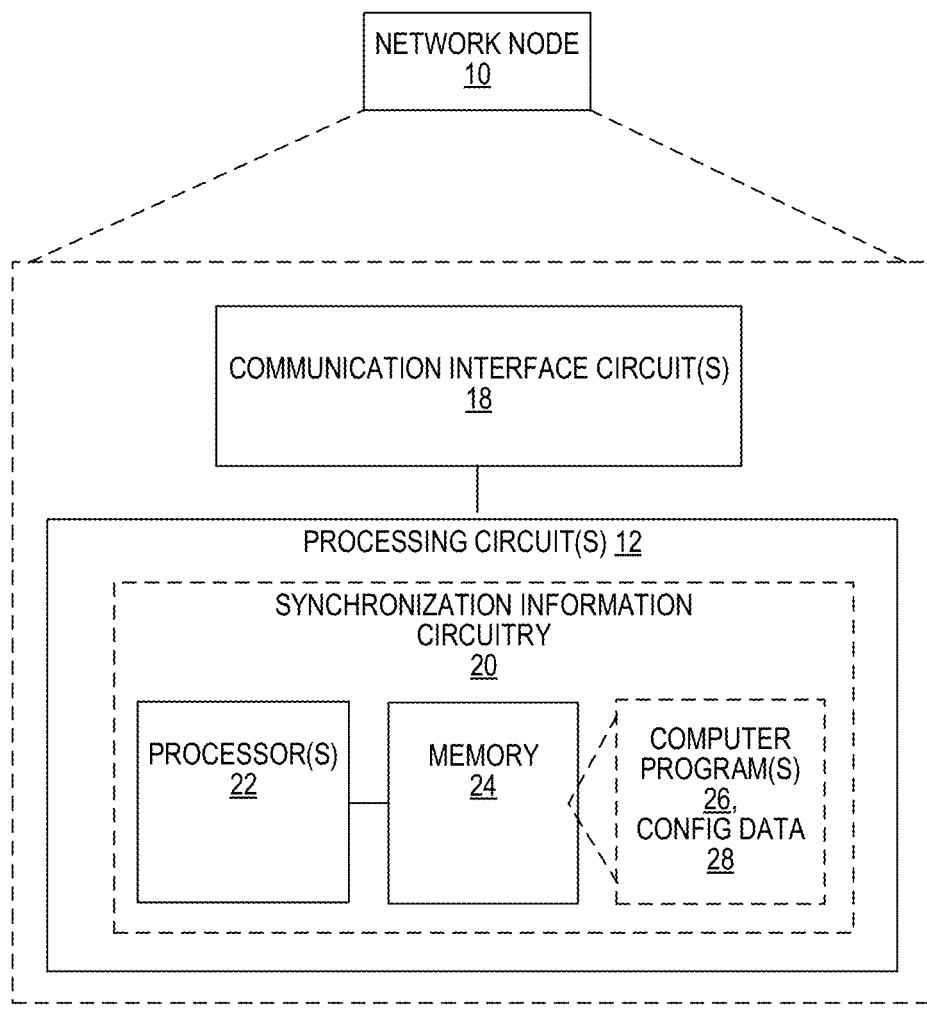
FIG. 6 illustrates a block diagram of a network node configured to send synchronization information, according to some embodiments.

The embodiments described herein provide for a more accurate synchronization. FIG. 6 illustrates a diagram of a first device as a network node 10, according to some embodiments. The network node 10 resides in the core network and facilitates communication between access networks and the Internet using communication interface circuit 18. The communication interface circuit 18 includes circuitry for communicating with other nodes in the core network, radio nodes, and/or other types of nodes in the network for the purposes of providing data and cellular communication services. According to various embodiments, cellular communication services may be operated according to any one or more of the 3GPP cellular standards, GSM, GPRS, WCDMA, HSDPA, LTE and LTE-Advanced.

The network node 10 also includes one or more processing circuits 12 that are operatively associated with the communication interface circuit 18. For ease of discussion, the one or more processing circuits 12 are referred to hereafter as "the processing circuit 12". The processing circuit 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 12 may comprise fixed circuitry, or programmable circuitry that is specially configured via the execution of program instructions implementing the functionality taught herein, or may comprise some mix of fixed and programmed circuitry. The processor 22 may be multi-core having two or more processor cores utilized for enhanced performance, reduced power consumption, and more efficient simultaneous processing of multiple tasks.

The processing circuit 12 also includes a memory 24. The memory 24, in some embodiments, stores one or more computer programs 26 and, optionally, configuration data 28. The memory 24 provides non-transitory storage for the computer program 26 and it may comprise one or more types of computer-readable media, such as disk storage, solid-state memory storage, or any mix thereof. By way of non-limiting example, the memory 24 comprises any one or more of SRAM, DRAM, EEPROM, and FLASH memory, which may be in the processing circuit 12 and/or separate from the processing circuit 12.

In general, the memory 24 comprises one or more types of computer-readable storage media providing non-transitory storage of the computer program 26 and any configuration data 28 used by the network node 10. Here, "non-transitory" means permanent, semi-permanent, or at least temporarily persistent storage and encompasses both long-term storage in non-volatile memory and storage in working memory, e.g., for program execution.

The processor 22 of the processing circuit 12 may execute a computer program 26 stored in the memory 24 that configures the processor 22 to send synchronization information. The processor 22 is configured to determine transmitter location information indicating a location for each of one or more transmitters that provide synchronization signals, insert the transmitter location information in a time synchronization IE and transmit the time synchronization IE to at least one other device. This structure and functionality may be performed by synchronization information circuitry 20 in the processing circuit 12.

Figure 7:
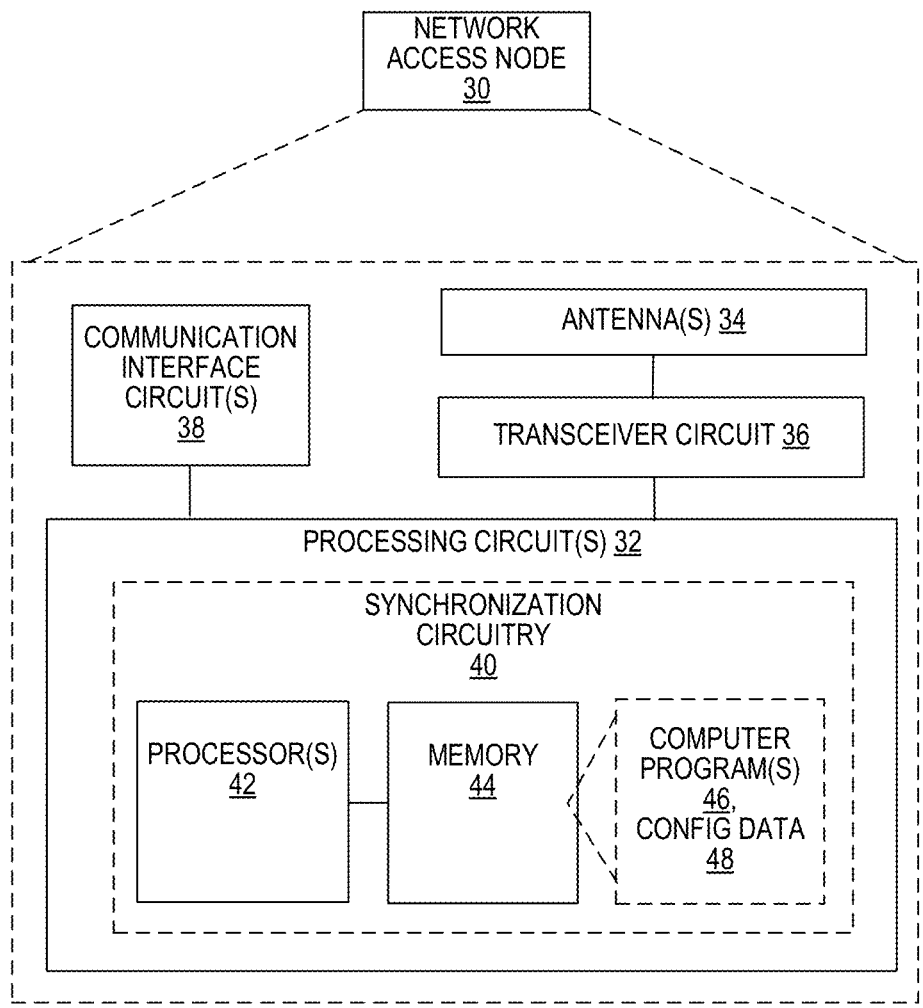
FIG. 7 illustrates a block diagram of a network access node configured to send or receive synchronization information, according to some embodiments.

FIG. 7 illustrates a diagram of a first device as a network access node 30, according to some embodiments. The network access node 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The network access node 30 may also include a communication interface circuit 38 for communicating with nodes in the core network such as the network node 10, other peer radio nodes, and/or other types of nodes in the network. The network access node 30 may be, for example, a base station or an eNodeB.

The network access node 30 also includes one or more processing circuits 32 that are operatively associated with the communication interface circuit 38 and transceiver circuit 36. The processing circuit 32 comprises one or more digital processors 42, e.g., one or more microprocessors, microcontrollers, DSPs, FPGAs, CPLDs, ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processor 42 of the processing circuit 32 may execute a computer program 46 stored in the memory 44 that configures the processor 42 to determine an accuracy of synchronization information. The processor 42 is configured to receive transmitter (transmission point) location information, from another second device, in an IE indicating a location for each of one or more transmitters that provide synchronization signals. The processor 42 is configured to determine one or more propagation delays of a synchronization signal received from a transmitter based on transmitter location information received for the transmitter in the IE and use the determined one or more propagation delays to synchronize the first device to a transmitter of the synchronization signal. For example, the propagation delays may be used to compensate for a timing difference between the first device and the transmitter of the synchronization signal. This structure and functionality may be referred to as synchronization circuitry 40 in the processing circuit 32.

In other embodiments, the processor 42 of the processing circuit 32 may execute a computer program 46 stored in the memory 44 that configures the processor 42 to send synchronization information. The processor 42 is configured to determine transmitter location information indicating a location for each of one or more transmitters that provide synchronization signals, insert the transmitter location information in a time synchronization IE and transmit the time synchronization IE to at least one other device. This structure and functionality may be performed by synchronization circuitry 40 in the processing circuit 32.

Figure 8:
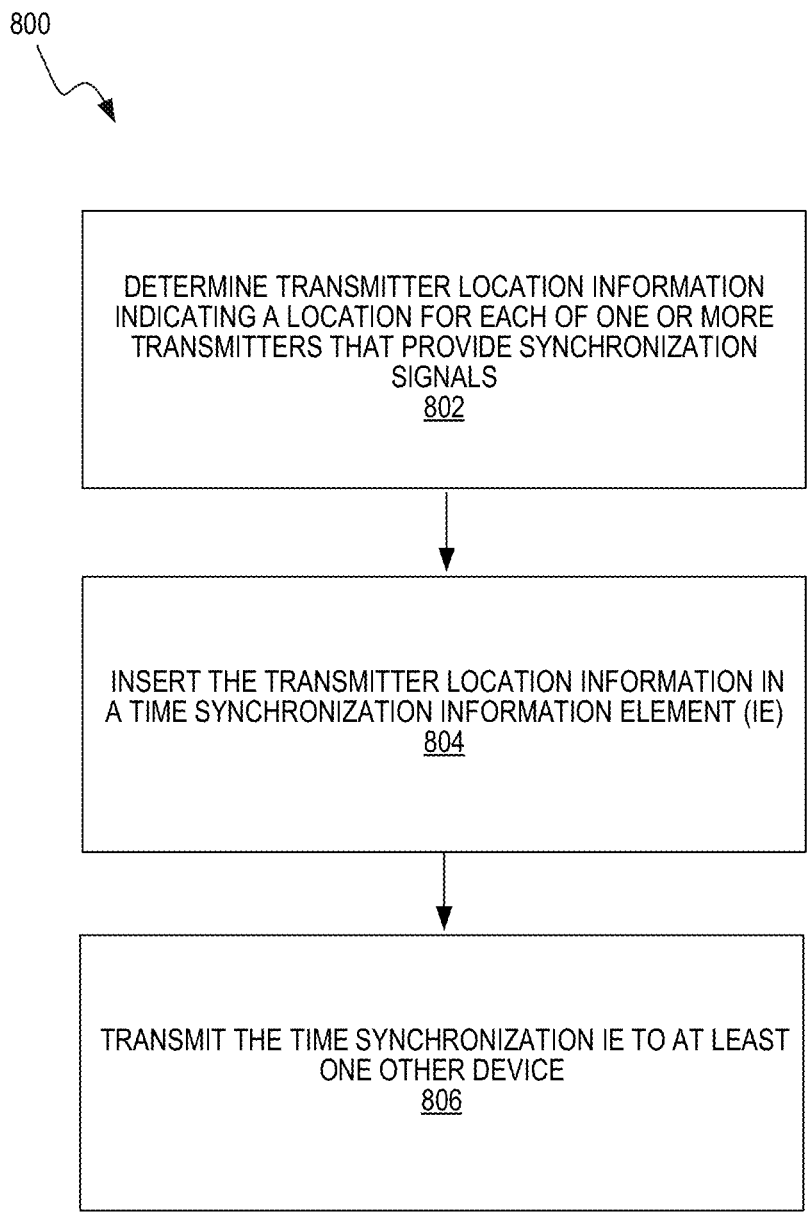
FIG. 8 illustrates a method in a network node or network access node for sending synchronization information, according to some embodiments.

In some embodiments, the processing circuit 12 and/or the processing circuit 32 are configured to perform a method for sending synchronization information. For example, FIG. 8 illustrates a method 800 that includes determining transmitter location information indicating a location for each of one or more transmitters that provide synchronization signals (block 802). The method 800 also includes inserting the transmitter location information in an IE, such as a time synchronization IE (block 804), and transmitting the time synchronization IE to at least one other device (block 806). The time synchronization IE may include a stratum level and a synchronization status.

In some cases, the first device is a network node and the at least one other device is a radio node, where inserting comprises inserting the transmitter location information in the time synchronization IE, and where transmitting comprises transmitting the time synchronization IE over an interface. In other cases, the first device is a first radio node and the at least one other device is a second radio node, where inserting comprises inserting the transmitter location information in a served cell IE and wherein transmitting comprises transmitting the served cell IE over an interface between the first and second radio nodes.

The transmitter location information may comprise accuracy information indicating an accuracy of the transmitter location information, whether a cell served by a transmitter is also served by multiple transmitters, or one or more cells served by each transmitter.

Determining transmitter location information may comprise acquiring information pertaining to the transmitter location information from a network node or one or more radio nodes.

Figure 9:
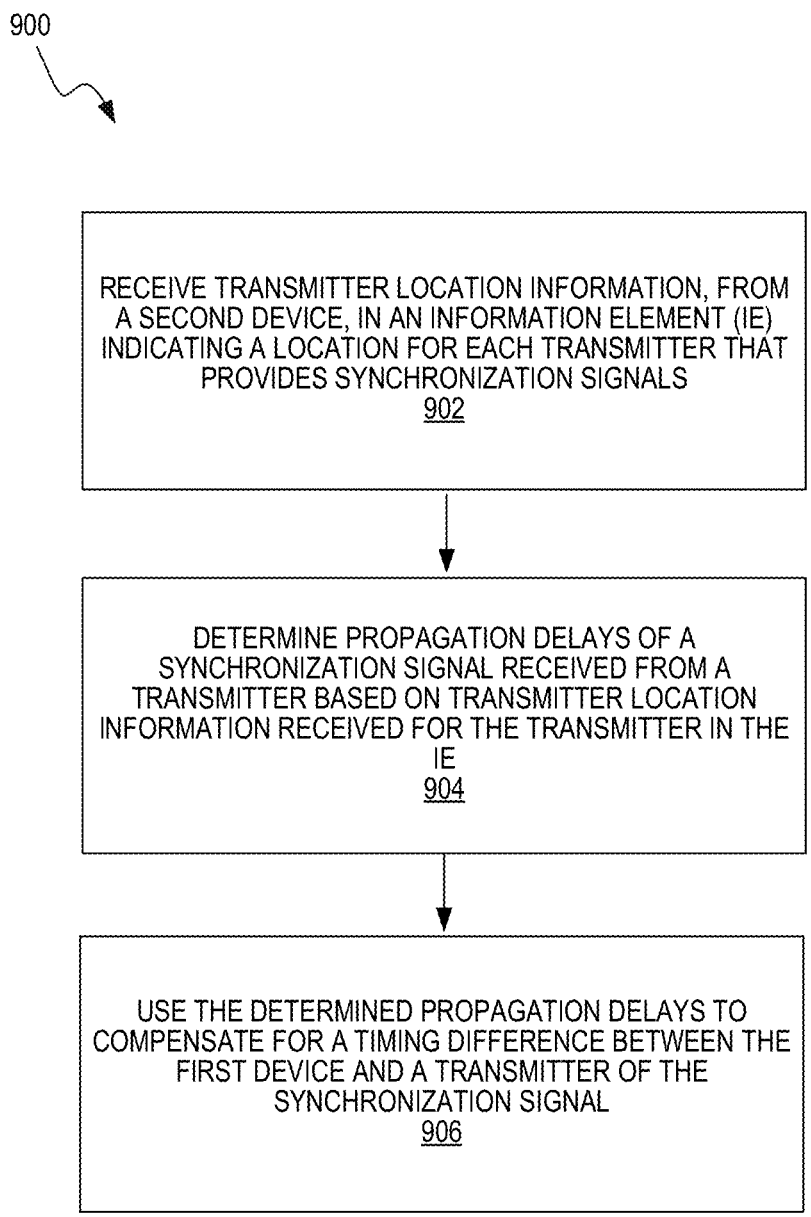
FIG. 9 illustrates a method in a network access node for receiving synchronization information, according to some embodiments.

In some embodiments, the processing circuit 32 is configured to perform a method for receiving synchronization information. For example, FIG. 9 illustrates a method 900 that includes receiving transmitter location information, from another or a second device, in an IE indicating a location for each of one or more transmitters that provide synchronization signals (block 902). The method 900 also includes determining one or more propagation delays of a synchronization signal received from a transmitter based on transmitter location information received for the transmitter in the IE (block 904) and using the determined one or more propagation delays to compensate for a timing difference between the first device and a transmitter of the synchronization signal (block 906). This may include determining a synchronization timing for transmissions based on a synchronization signal received from the transmitter and the determined propagation delays. This may also include adjusting a synchronization timing based on the determined propagation delays.

In some embodiments, the transmission point location information for the transmission point serving a given antenna is provided in the signaling supporting over the air synchronization. According to a current standard, such signaling occurs over the S1 interface. However, the embodiments described herein may apply to any signaling interface where synchronization information is conveyed.

The method 900 may include transmitting a request for transmitter location information in a self-organizing network (SON) IE, where the received transmitter location information corresponds to the request.

In some cases, the transmitter location information comprises accuracy information indicating an accuracy of the transmitter location information, and the method 900 further comprises determining the one or more propagation delays based on the accuracy information. In other cases, the transmitter location information comprises information indicating whether a cell served by a transmitter is also served by multiple transmitters, and the method 900 further comprises determining the one or more propagation delays based on an average of propagations delays from the multiple transmitters. In some cases, the transmitter location information comprises cell information indicating one or more cells served by each transmitter, and the method 900 further comprises identifying a cell whose synchronization reference signal is transmitted from the transmitter based on the cell information.

Figure 10:
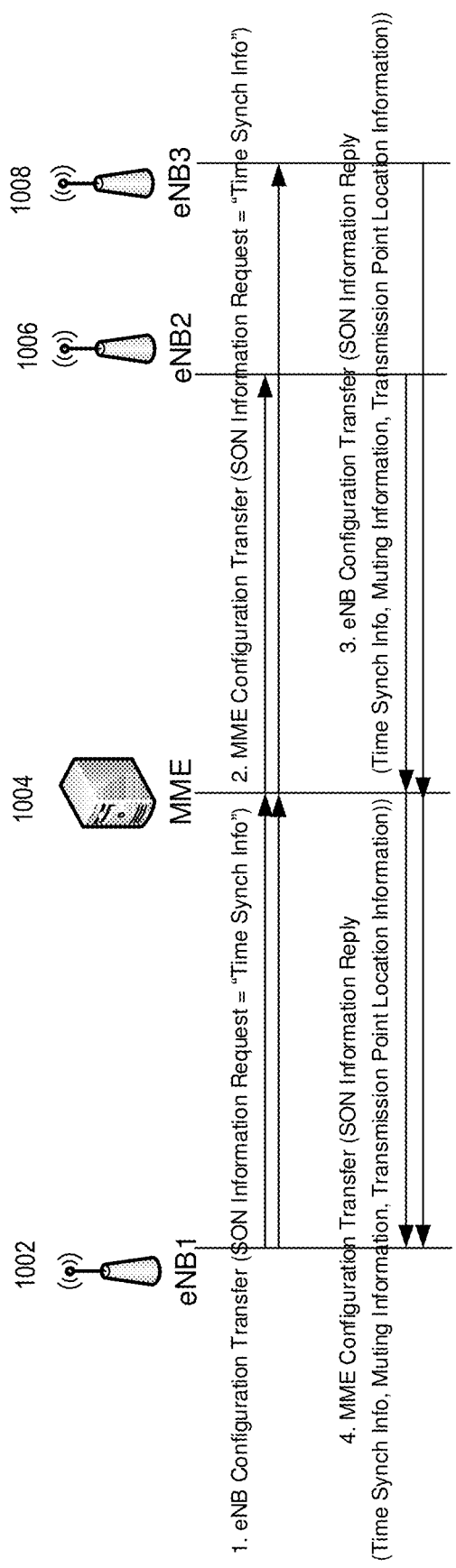
FIG. 10 illustrates an example of a signaling procedure to enable/disable muting patterns for RIBS, according to some embodiments.

In FIG. 10, it can be seen that the existing signaling to convey an IE, such as the Time Synchronization Information IE, is enriched with new information regarding the transmission point locations. This new information may be sent as the consequence of a previously received request, e.g., in the form of a SON Information Request IE set to the "Time Synchronization Info" value. For example, at a first step, a SON Information Request is sent from an eNB1 1002 to an MME 1004, which sends the SON Information Request to eNB2 1006 and/or eNB3 1008 (step 2). A SON Information Reply may be sent from the eNB2 1006 and/or eNB3 1008 to the MME 1004 (step 3), which sends the SON Information Reply to the eNB1 1002 (step 4). The SON Information Reply can include time synchronization information, muting information, transmission point location information, etc.

Alternatively, the information may be sent independently, i.e., without the need for a previous request. The latter case could occur if the transmission points at the sending node change location. The node may therefore send an unsolicited eNB Configuration Transfer message including the Transmission Point Location Information IE to nodes in its neighborhood or to nodes that previously sent a SON Information Request set to "Time Synchronization Info".

The new information may include transmission point location information in the form of latitude, longitude and elevation (with respect to a zero reference such as sea level). A transmission point consists of an entity, e.g. an antenna, from which the synchronization reference signal used for over the air synchronization is transmitted. In a current over the air synchronization function specified in 3GPP, the signals used for over the air synchronization are Cell specific Reference Signal (CRS) and Positioning Reference Signal (PRS). However, the methods herein cover any possible signal that might be used for over the air synchronization.

For each transmission point location in the list there might be one or more cell identifier parameters listed. Such cell identifiers may be the Physical Cell Identifier (PCI), the Evolved Cell Global Identity (E-CGI) or other parameters that may help identify the cell whose synchronization reference signal is transmitted from the transmission point.

The processing circuit 12 and/or the processing circuit 32 are configured to send synchronization information. The processing circuit 12 and/or the processing circuit 32 are configured to insert, in a time synchronization IE, location information for a transmitter associated with one or more cells, the location information indicating two or more transmitter locations for the transmitter. The processing circuit 12 and/or the processing circuit 32 are configured to transmit the time synchronization IE to at least one other device. An IE, or any other signal with comparable information, may be sent and received via communication interface circuits 18/38 and/or transceiver circuit 36.

Figure 13:
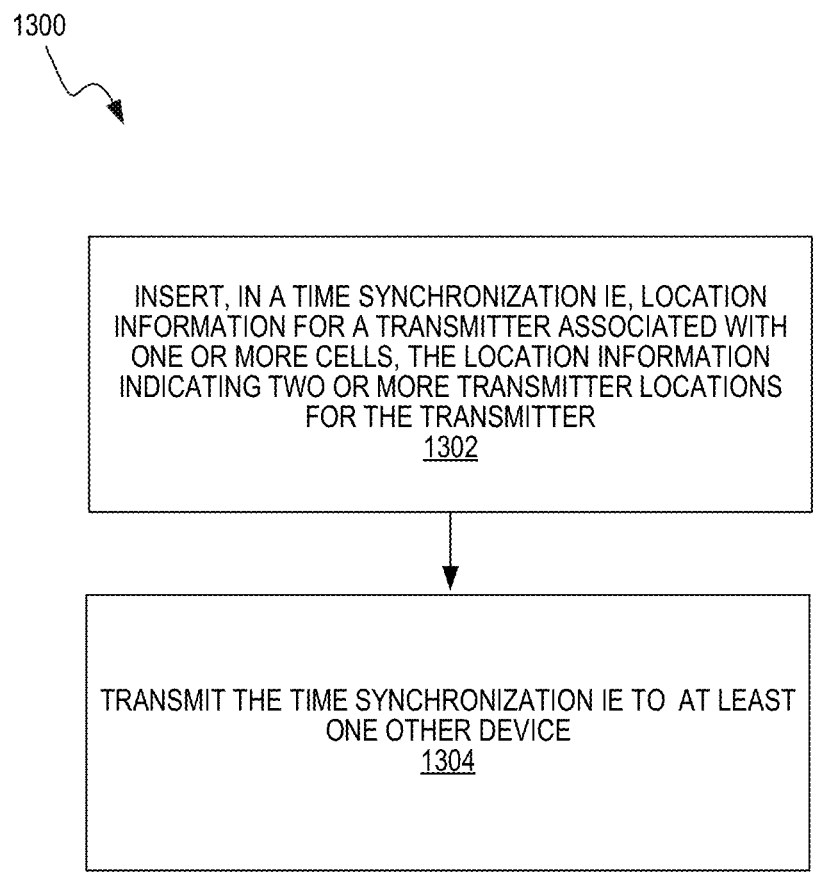
FIG. 13 illustrates a method in a network node or network access node for sending synchronization information, according to some embodiments.

Irrespective of the exact implementation, the processing circuit 12 and/or the processing circuit 32 are configured to perform a method 1300 (FIG. 13) for sending synchronization information, according to some embodiments. The method 1300 includes inserting, in a time synchronization IE, location information for a transmitter associated with one or more cells, the location information indicating two or more transmitter locations for the transmitter (block 1304) and transmitting the time synchronization IE to at least one other device (block 1306). In some cases, the information to be inserted may be received, identified or determined.

In some cases, inserting the location information comprises encoding a latitude, a longitude, and an elevation of each of the two or more transmitter locations into the location information. Inserting the location information may include inserting multiple transmitter locations for the transmitter, where the multiple transmitter locations define an area within which an estimated location of the transmitter resides. The inserting may also include inserting a first transmitter location for the transmitter, the first transmitter location indicating a point approximately at a center location of the area where an exact location of the transmitter could reside.

An example of how such information may be provided as part of the Time Synchronization Information IE 1100 signaled over the S1 interface is shown in FIG. 11. The information in FIG. 11 describes a model where transmission point location information 1102, such as a list of transmission point locations and associated cells, is provided. A transmission point location is identified in terms of information indicating a latitude 1104, longitude 1106 and elevation 1108. Such parameters may be represented via a numerical notation, e.g., as real numbers. The elevation should represent the height of the transmission point measured from a reference point such as sea level. For each transmission point location, a list of cells 1110 is provided, where each listed cell has the reference signal used for synchronization purposes transmitted by the transmission point. Cells may be identified by identifiers, such as E-CGIs 1112.

Alternatively, the transmission point location information may be encoded by means of bit strings, each of them representing latitude 1104, longitude 1106 and altitude or elevation 1108. The numerical value of the binary string may be mapped to one value of each of the location information coordinates. For example, if the latitude 1104 and longitude 1106 are encoded by means of a 24-bit string, each numerical value of the string may represent a positive or negative value of the latitude 1104 or longitude 1106 expressed in degrees.

In another embodiment, the transmission point location information may be enriched with a parameter denoting the tolerance or accuracy of the location. This parameter may include a numerical value and may represent the radius of a circular or spherical area, centered on the declared location, within which the exact location of the transmission point, or transmitter, may reside.

Figure 12:
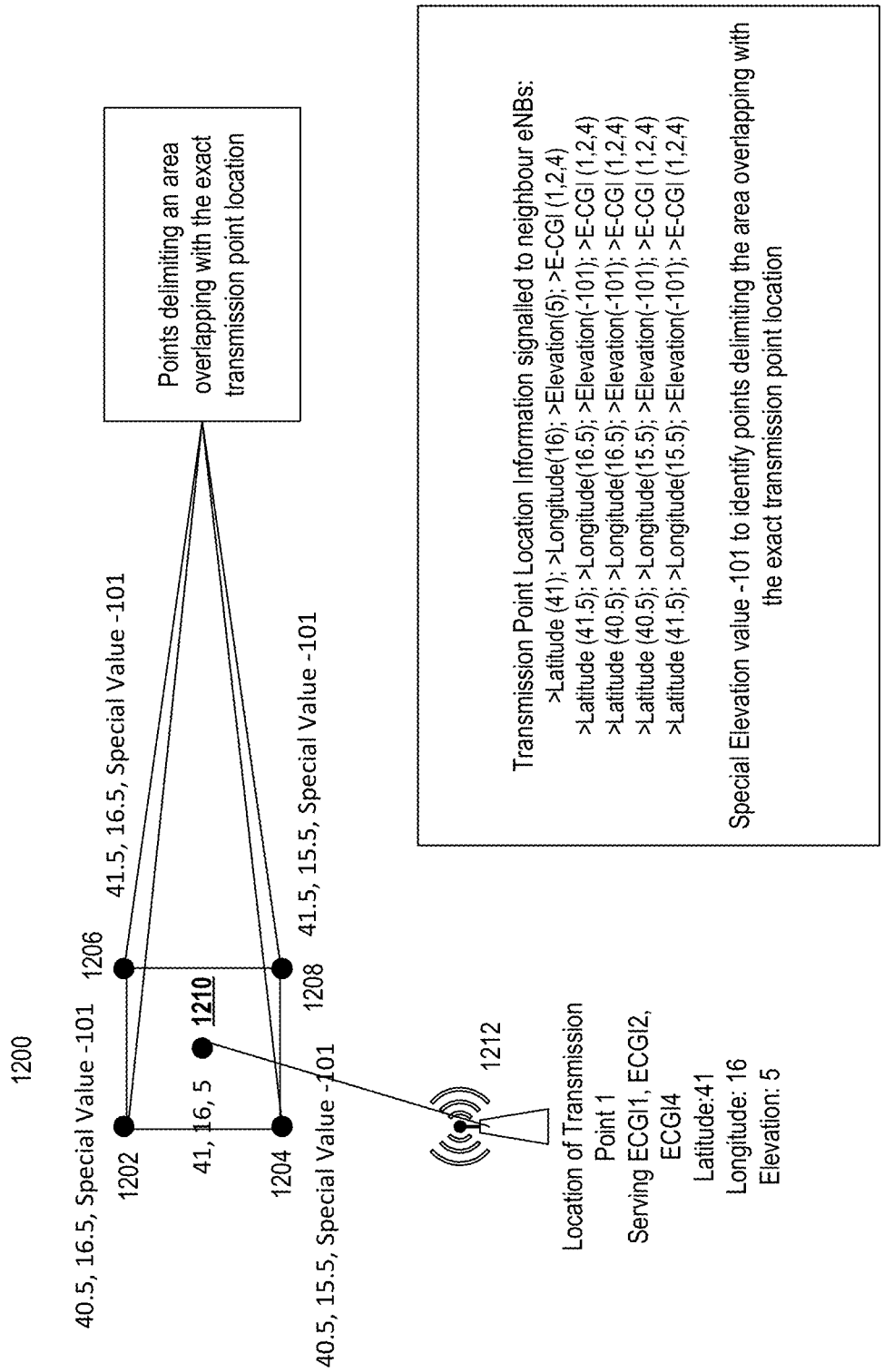
FIG. 12 illustrates a representation of location accuracy, according to some embodiments.

In some embodiments, the accuracy of the transmission point location may be deduced by ways of encoding the latitude, longitude, elevation and a list of cells. For instance, multiple transmission point locations can be signaled for the same list of cells. Each transmission point location may represent points on the boundary of an area within which the exact location 1210 of the transmission point (transmitter) 1212 resides. This is shown, for example, in FIG. 12 where transmission point locations 1202, 1204, 1206 and 1208 define an area 1200. Therefore, the accuracy of the transmission point location may be deduced by determining the area 1200 delimited by the locations 1202-1208 associated to the same cell list. The receiving node may deduce that the multiple transmission point locations 1202-1208 refer to the same transmission point and represent an estimation of the location accuracy by realizing that all locations associated to the same cell list are in close proximity with each other and by realizing that the list of cells for the multiple locations is the same.

In another example, the transmission point location accuracy may be represented by signaling a first transmission point location information with a given location and a given list of cells and by further signaling multiple transmission point location information with the same list of cells as the first information but with the elevation parameter set to a specific value. The first location information gives a point approximately at the center of the area where the exact location 1210 could reside, while the transmission point locations using the specific elevation value represent the latitude and longitude of an area 1200 overlapping with the exact transmission point location 1210. It should be specified that the special value used for the elevation parameter may be achieved via other parameters. For example, a special value may be given to the latitude or longitude.

While the estimated transmission point location 1210 is described as approximately representing the center area where the exact location of the transmitter may be included, the transmission point location does not need to always be placed in the center of such area. This initial location is the "best guess" that can be derived for the location of the transmission point. For example, if an eNB is equipped with a Global Navigation Satellite System (GNSS) received and only a limited number of satellite signals can be tracked, the eNB may combine the location information derived by GNSS (which may be partial location information) with other information such as served UE measurements of other cells of which the location is known. This may give a first non-accurate indication of the eNB location for which the eNB can take the most likely X, Y, Z coordinates. Such coordinates could constitute the "center location".

In another scenario where a GNSS antenna signal is shared by several indoor eNBs by signal splitting, the location of a transmitter of such eNBs may not be accurate using GNSS location info. In this case, the user equipment of another cell with a known position/location could be used to check the accuracy of the GNSS location of transmitter. For example, the estimated accuracy of the center location may be based on a comparison of the location information derived by the GNSS and the user equipment measurements of the other cells with known locations.

In a case where the GNSS location is less accurate than a UE-derived transmitter location, the following alternative could be used. In such an alternative embodiment, the "center location" may be derived by a central node that receives neighbor cell measurements collected by UEs served by an eNB and that calculates the eNB position by using such measurements and on the basis of knowing at least some of the neighbor cells transmission point locations. There may be other methods to calculate such a "center location".

However, the eNB may also have an estimation of what the center location accuracy is. That is, the eNB may know the error to which the center location coordinates are subject to. The eNB can therefore provide the "location area" as per embodiment description. The center location should be included in this area, but not necessarily at the center of it.

Various embodiments allow the receiving node to understand the error for the transmission point location and thus compensate its own timing accordingly, in the attempt to perfectly synchronize with the synchronization signal source.

To that end, the processing circuit 32 is also configured to perform over-the-air synchronization. According to some embodiments, the processing circuit 32 is configured to receive location information for a transmitter associated with one or more cells, from the second device, in an IE indicating a location for the transmitter. The processing circuit 32 is configured to determine two or more transmitter locations from the location information and determine an estimated location for the transmitter and an accuracy for the estimated location based on the two or more transmitter locations. The processing circuit 32 is also configured to determine synchronization timing for transmissions by the first device, based on a synchronization signal received from the transmitter, the estimated location, and the accuracy.

Figure 14:
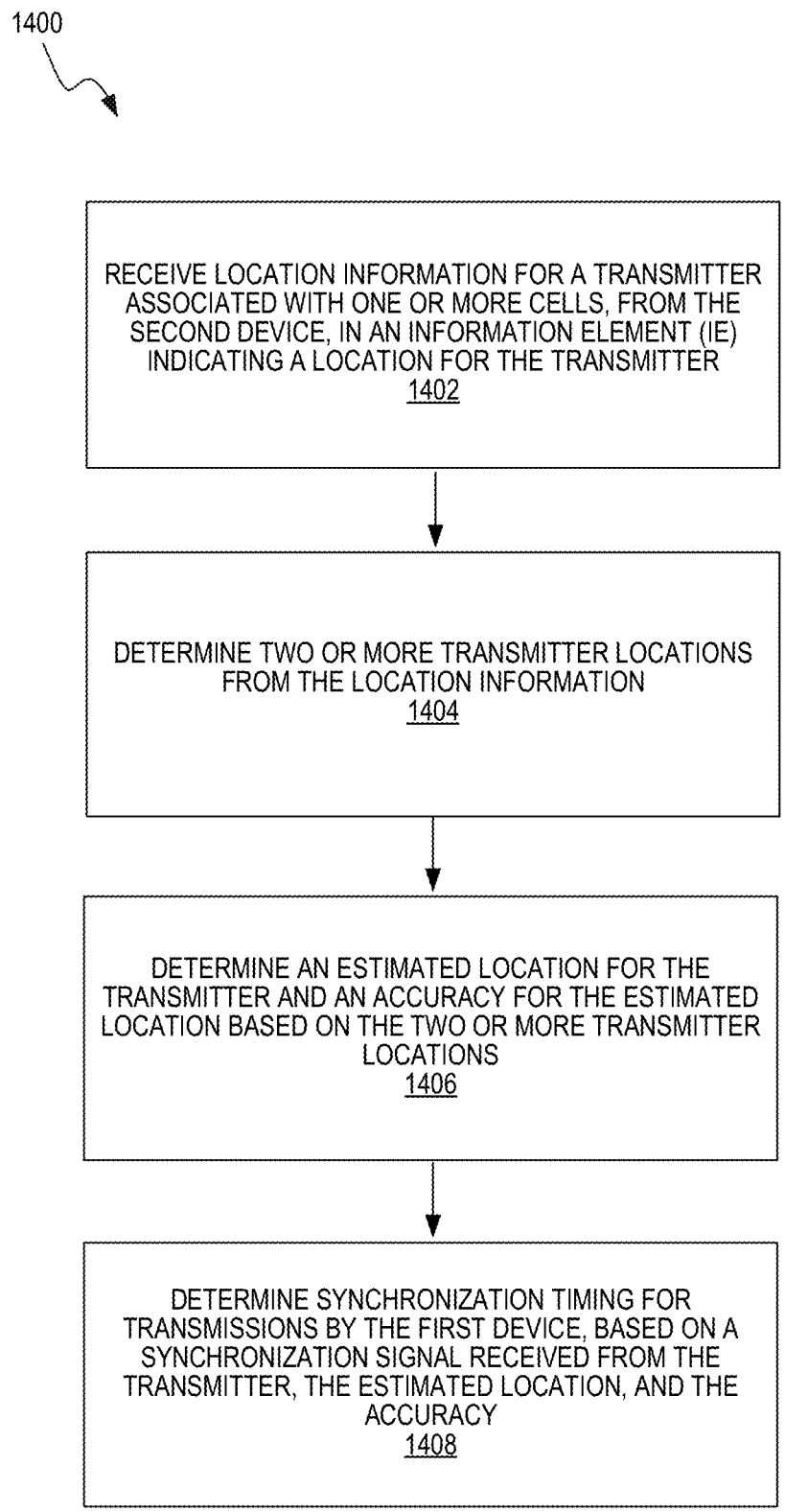
FIG. 14 illustrates a method in a network access node for performing over-the-air synchronization, according to some embodiments.

Irrespective of the exact implementation, the processing circuit 32 is also configured to perform a method 1400 (FIG. 14) for receiving such information and determining an accuracy of synchronization information, according to some embodiments. The method 1400 includes receiving location information for a transmitter associated with one or more cells, from a second device, in an IE indicating a location for the transmitter (block 1402). The method 1400 includes determining two or more transmitter locations from the location information (block 1404) and determining an estimated location for the transmitter and an accuracy for the estimated location based on the two or more transmitter locations (block 1406). The method 1400 also includes determining synchronization timing for transmissions by the first device, based on a synchronization signal received from the transmitter, the estimated location, and the accuracy (block 1408). The method 1400 may include decoding a latitude, a longitude, and an elevation of each of the two or more transmitter locations from the location information.

In some embodiments, the method 1400 determines the accuracy by identifying that the two or more transmitter locations are in close proximity to each other in the same cell or group of cells and that the two or more transmitter locations are associated with the same transmitter and represent an accuracy of the estimated transmitter location. Determining the accuracy may include determining the accuracy comprises using the same elevation parameter value for the two or more transmitter locations. Determining the accuracy may also include determining an area within which an estimated location of the transmitter resides, the area defined by the two or more transmitter locations, responsive to a determination that the two or more transmitter locations are associated with the same cell or group of cells.

The method 1400 may include determining a point approximately at a center location of the area indicating where an exact location of the transmitter could reside. This may also include determining an estimated accuracy of the center location. The center location may be determined based on a combination of location information derived by a GNSS and user equipment measurements of other cells with known. The center location may be received from a central node that calculates a position of a radio access node based on measurements of neighbor cells collected by user equipments served by the radio access node and known locations of the neighbor cells. The method 1400 may include determining synchronization timing by identifying that the two or more transmitter locations are associated with the same cell and determining synchronization timing based on a propagation delay derived from a weighted average of propagation delays of the two or more transmitter locations.

In another embodiment, the transmission point location information may be provided as part of the information on served cells exchanged by two nodes, e.g. eNBs, in proximity. For example, the Served Cell Information IE is signaled via the X2 Setup Request, X2 Setup Response and eNB Configuration Update messages over the X2 interface between two eNBs. This IE contains the details of a cell served by the sending eNB. The cell information may be enhanced by adding location information of the transmission point serving the cell.

For example, the transmission point location IE may follow a similar representation as that described above. It may include a latitude, a longitude, an elevation and optionally one or more location accuracy parameters.

It should be noted that the enhancements proposed for the Served Cell Information IE can be applied also to cell information update procedures such as the X2: eNB Configuration Update message or other similar procedures. An example of the enhancements for a Served Cell IE 1500 is shown in FIG. 15. The transmission point location information 1502 is shown in the last row of the table representing the message or IE.

In another embodiment, determining transmitter location information comprises acquiring information pertaining to the transmitter location information from a network node or one or more radio nodes. The information acquired may be information on transmission point locations. The information may also be synchronization target distance information. For example, this may be information on the relative distance between the transmission point transmitting the synchronization reference signals and the receiving point at the synchronization target node. Such information may be acquired from a central node such as the OAM system.

Figure 16:
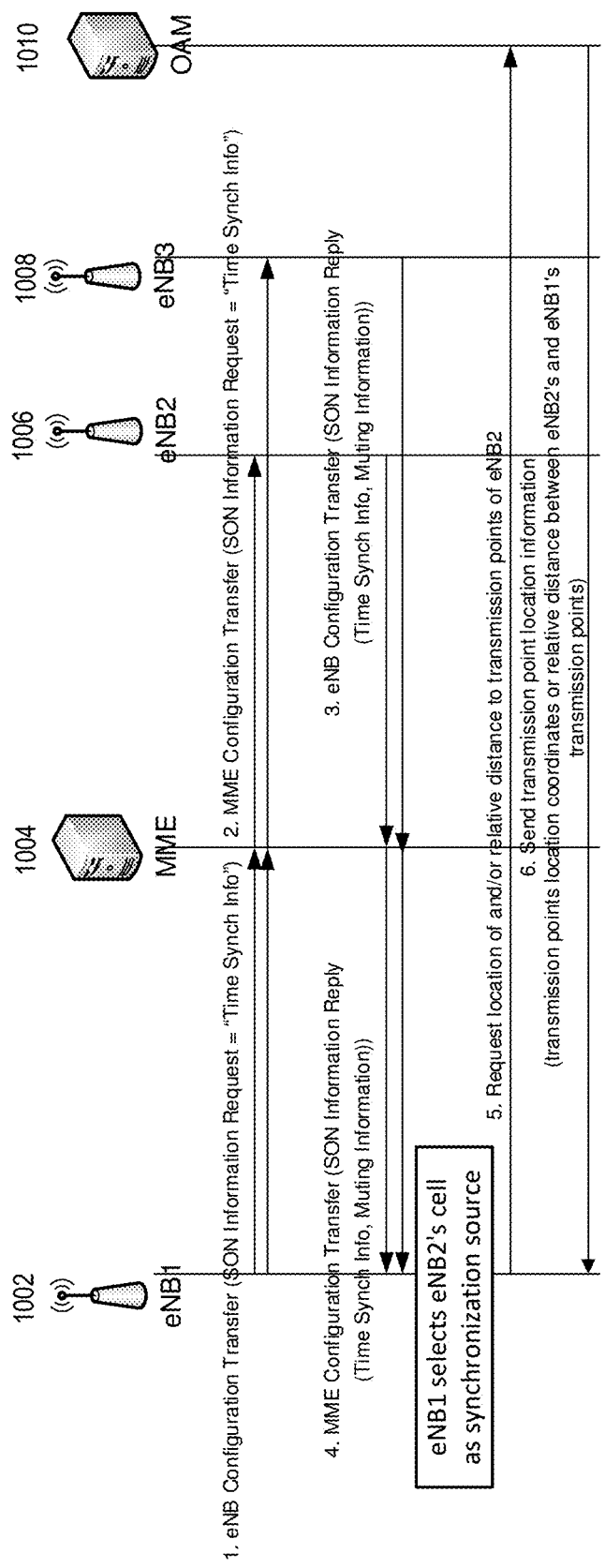
FIG. 16 illustrates an example of central node based transmission point information retrieval, according to some embodiments.

In this method, illustrated by the embodiment in FIG. 16, an eNB 1002 would acquire time synchronization information from neighboring eNBs 1006, 1008 according to currently standardized S1 interface procedures. However, once the eNB 1002 in need of synchronization chooses the best cell to synchronize with, a request can be sent to a central node such as the OAM system 1010 (step 5), asking for reporting of the transmission points locations per cell of the eNB serving the selected synchronization source cell and/or asking for the relative distance of the transmission point serving the selected synchronization source cell from the transmission points of the synchronization target eNB.

The central node is supposed to know the location of transmission points in a wide neighborhood including the synchronization source and target eNBs, hence the central node is able to calculate the relative distance and to signal it back to the requesting eNB, eventually including the location information of transmission points per cell of the synchronization source eNB.

In some embodiments, a node that has received the transmission point location information from a different node, either as a reply to a request or as an independent message, may verify whether the location of the transmission point has changed by means of processing UE measurements. For example, an eNB may use Reference Signal Received Power (RSRP) measurements collected by different UEs for a given cell for which transmission point location information was received. The eNB may deduce the position of the UEs reporting the measurements by means of, e.g., Timing Advance settings, Angle of Arrival, other reported cells and their signal strength. With these two pieces of information, namely RSRP measurements for the monitored cell and position of the UEs reporting the measurements, the eNB may be able to deduce the position of the transmission point serving the monitored cell. With such information the eNB may be able to deduce whether the transmission point location previously received is still valid or whether the transmission point location for the monitored cell has changed. In case the eNB determined that such location has changed, a new message containing the SON Information Request IE set to "Time Synchronization Info" can be sent to the node serving the monitored cell and a new set of transmission point location information may be received.

In some embodiments, the information for a transmission point location may also include details on whether the cell served by the transmission point is also served by other transmission points at the same time. This enhancement can be achieved by adding a flag IE to the information specified in the embodiments above. Such a flag would be added per cell and it may specify whether the cell served by the transmission point associated to it is also served by other transmission points. A node receiving such a flag would deduce that if multiple transmission point locations are associated to the same cell, that cell is served by multiple transmission points, i.e., its synchronization reference signals are transmitted from different points. The node attempting to synchronize to the reference signals of such a cell may decide to adopt a propagation delay estimation derived from a weighted average of propagation delay from each single transmission point. For example, a higher weight may be given to a propagation delay from the closest transmission point (i.e. the point transmitting signals likely received with highest power).

FIG. 17 shows an example of how the information can be provided in a Served Cell Information IE 1500. For example, information about multipoint transmission 1702 for a given cell may be achieved by associating multiple transmission points to the same cell. With respect to embodiments relative to deducing location information accuracy, it should be specified that multipoint transmission information should be deduced only if the same cell is added to transmission point location information 1502 where no special value is used. A node receiving information where the same cell is associated to multiple transmission point locations and attempting to synchronize to the reference signals of such cell may decide to adopt a propagation delay estimation derived from a weighted average of propagation delay from each single transmission point. For example, a higher weight may be given to propagation delay from the closest transmission point (i.e. the point transmitting signals likely received with highest power).

In any of the embodiments above, the transmission point location information may not be initially configured in the node that has to report them in terms of geolocation coordinates. This information may instead be configured in different formats. For example, the coordinates could be initially entered in the node as building address, building floor, apartment number. As part of some methods described above, the node configured with such initial information may be able to convert them into location coordinates, e.g., latitude, longitude and elevation. The latter may be achieved by means of comparison of initially entered location information and opportunely configured geographical maps. Such a comparison enables mapping of the initial information with the geolocation coordinates.

Embodiments described above provide for a more accurate synchronization to a detected source synchronization reference signals by enabling a device to account for propagation delays in the signaling between two eNBs used to achieve over the air synchronization.

The advantages of the embodiments include enabling correct functioning of all the features that require accurate synchronization between neighbor cells, such as eICIC, TDD transmission, Network Assisted Interference Cancellation and Suppression (NAICS), and Coordinated Multi-Point transmission and reception (CoMP).

In some embodiments, a first device in a wireless communication network sends synchronization information to other devices in the wireless communication network. For example, the first device determines transmission point location information indicating a location for each transmission point that provides synchronization signals and inserts the transmission point location information in a time synchronization information element (IE). The time synchronization IE is transmitted to at least one other device.

In some embodiments, a method, in a first device in a wireless communication network, for receiving synchronization information from a second device in the wireless communication network includes receiving transmitter location information, from the second device, in an IE indicating a location for each of one or more transmitters that provide synchronization signals, determining one or more propagation delays of a synchronization signal received from a transmitter based on transmitter location information received for the transmitter in the IE and using the determined one or more propagation delays to synchronize the first device to the synchronization signal.

In some embodiments, a list of transmission point locations and cells served by each transmission point is added to the Time Synchronization Information IE sent via S1 or eventually via any other interface carrying such information. The information may be sent as a response to a previous request for time synchronization information or it may be sent as an independent message.

In some embodiments, the transmission point location information may be added to the Served Cell Information IE exchanged over the X2 interface. Namely, this information can be added as part of the information signaled to a neighboring eNB concerning cells served by the sending node. Information about the transmission point location accuracy can be added to the transmission point location information or signaled as part of the list of transmission point location information, by listing different transmission point locations in close proximity with each other for the same cell or group of cells.

In some cases, information about whether a cell's signals are transmitted from multiple transmission points is provided. Information concerning multiple transmission point transmissions for a cell may be deduced from the transmission point location information list by means of listing the same cell to multiple transmission points.

Note that although terminology from 3GPP LTE has been used in this disclosure to describe embodiments of the invention, this should not be seen as limiting the scope of the invention to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general, "eNodeB" could be considered as device 1 and "UE" device 2, and these two devices communicate with each other over some radio channel. Similarly, when talking about signaling over an X2 or an S1 interface, the solutions are not limited to communication between eNBs or between eNB and the Core Network (CN), but the communicating nodes can be any node terminating the interface over which the information described is transmitted.

Various embodiments described herein also provide for avoiding an accumulation of propagation delays for nodes synchronizing to synchronization sources of a Stratum Level higher than zero. Indeed, without a way to compensate for propagation delays, a node that synchronizes with a synchronization source that is connected to a fully synchronized signal source would be subject to a synchronization error that is the accumulation of propagation delays over the two hops: the first between the fully synchronized signal and the synchronization source and the second that is between the synchronization source and the synchronization target. By means of a more accurate inter-node synchronization, the overall system capacity increases because of reduced losses due to cross cell interference.

Figure 18:
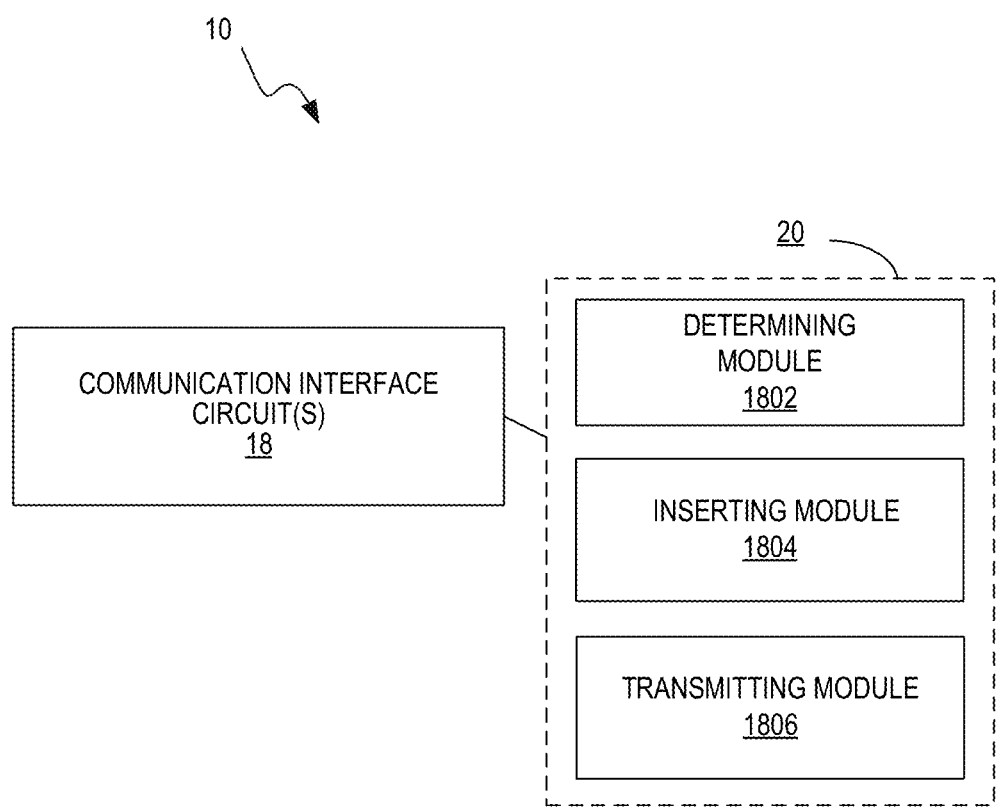
FIG. 18 illustrates a functional implementation of a network node for sending synchronization information, according to some embodiments.

FIG. 18 illustrates an example functional module or circuit architecture as may be implemented in the network node 10, e.g., based on the synchronization information circuitry 20. The illustrated embodiment at least functionally includes a determining module 1802 for determining transmitter location information indicating a location for each of one or more transmitters that provide synchronization signals. The embodiment also includes an inserting module 1804 for inserting the transmitter location information in a time synchronization information element. The embodiment further includes a transmitting module 1806 for transmitting the time synchronization IE to at least one other device.

Figure 19:
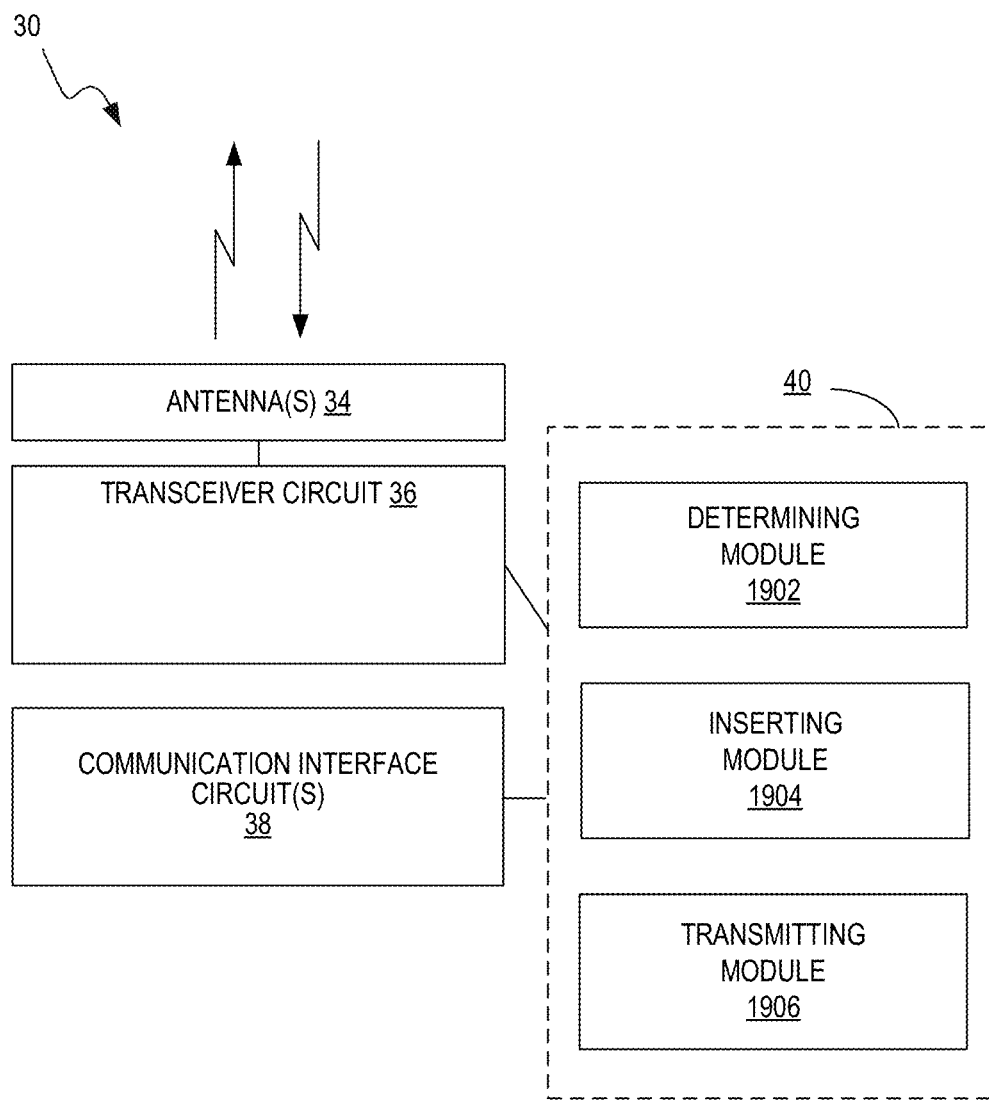
FIG. 19 illustrates a functional implementation of a network access node for sending synchronization information, according to some embodiments.

FIG. 19 illustrates an example functional module or circuit architecture as may be implemented in the access network node 30, e.g., based on the synchronization circuitry 40. The illustrated embodiment at least functionally includes a determining module 1902 for determining transmitter location information indicating a location for each of one or more transmitters that provide synchronization signals. The embodiment also includes an inserting module 1904 for inserting the transmitter location information in a time synchronization information element. The embodiment further includes a transmitting module 1906 for transmitting the time synchronization IE to at least one other device.

Figure 20:
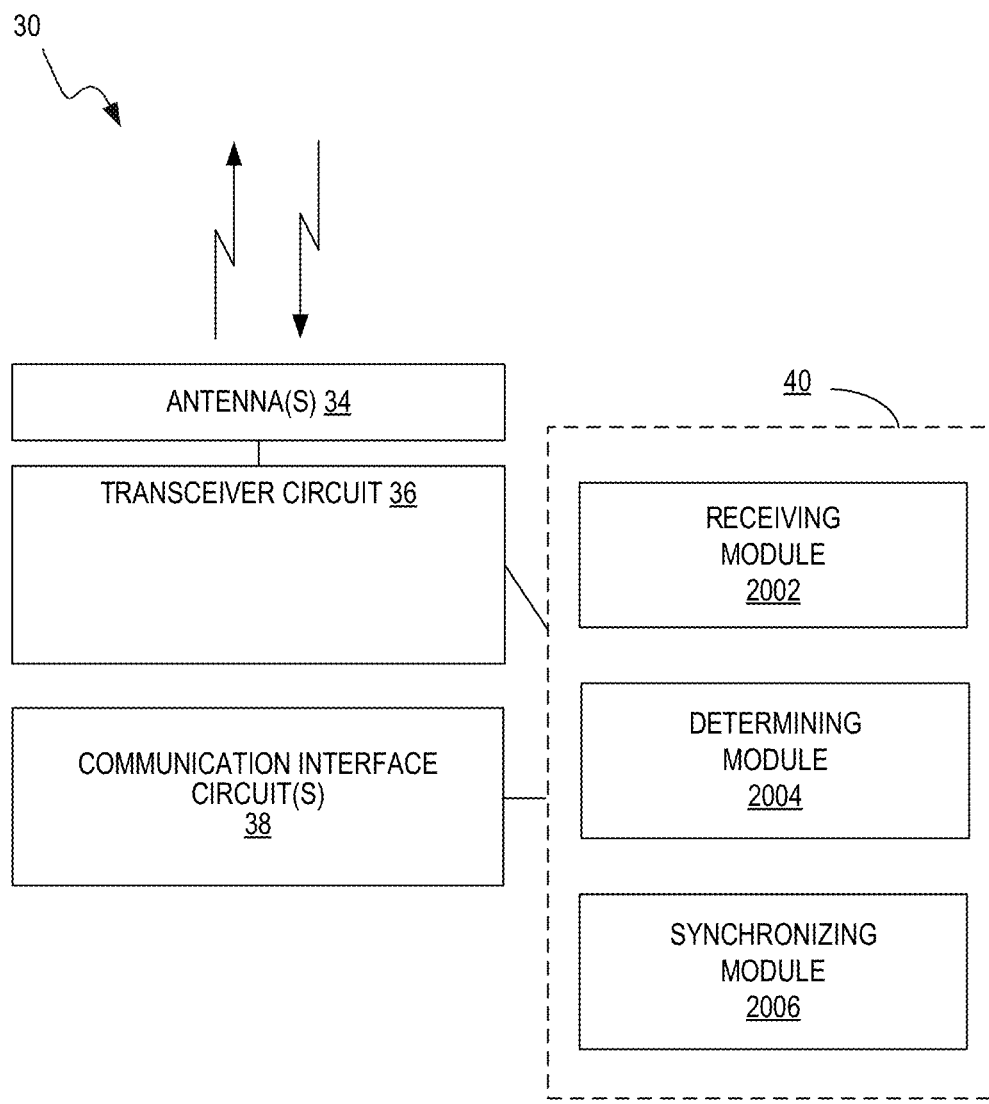
FIG. 20 illustrates a functional implementation of a network access node for receiving synchronization information, according to some embodiments.

FIG. 20 illustrates an example functional module or circuit architecture as may be implemented in a first device, such as the access network node 30 based on the synchronization circuitry 40. The illustrated embodiment at least functionally includes a receiving module 2002 for receiving transmitter location information, from a second device, in an IE indicating a location for each of one or more transmitters that provide synchronization signals. The embodiment also includes a determining module 2004 for determining one or more propagation delays of a synchronization signal received from a transmitter based on transmitter location information received for the transmitter in the IE. The embodiment further includes a synchronizing module 2006 for using the determined one or more propagation delays to compensate for a timing difference between the first device and a transmitter of the synchronization signal.

Figure 21:
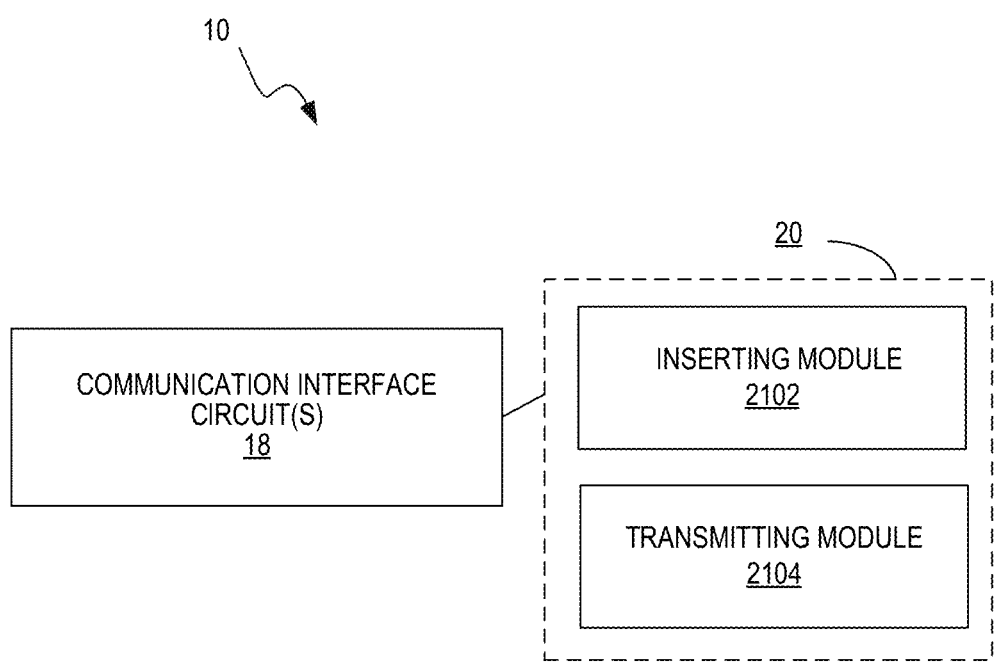
FIG. 21 illustrates a functional implementation of a network node for sending synchronization information, according to some embodiments.

FIG. 21 illustrates another example functional module or circuit architecture as may be implemented in the network node 10, e.g., based on the synchronization information circuitry 20. The illustrated embodiment at least functionally includes an inserting module 2102 for inserting the location information in a time synchronization IE. The method further includes a transmitting module 2104 for transmitting the time synchronization IE to at least one other device.

Figure 22:
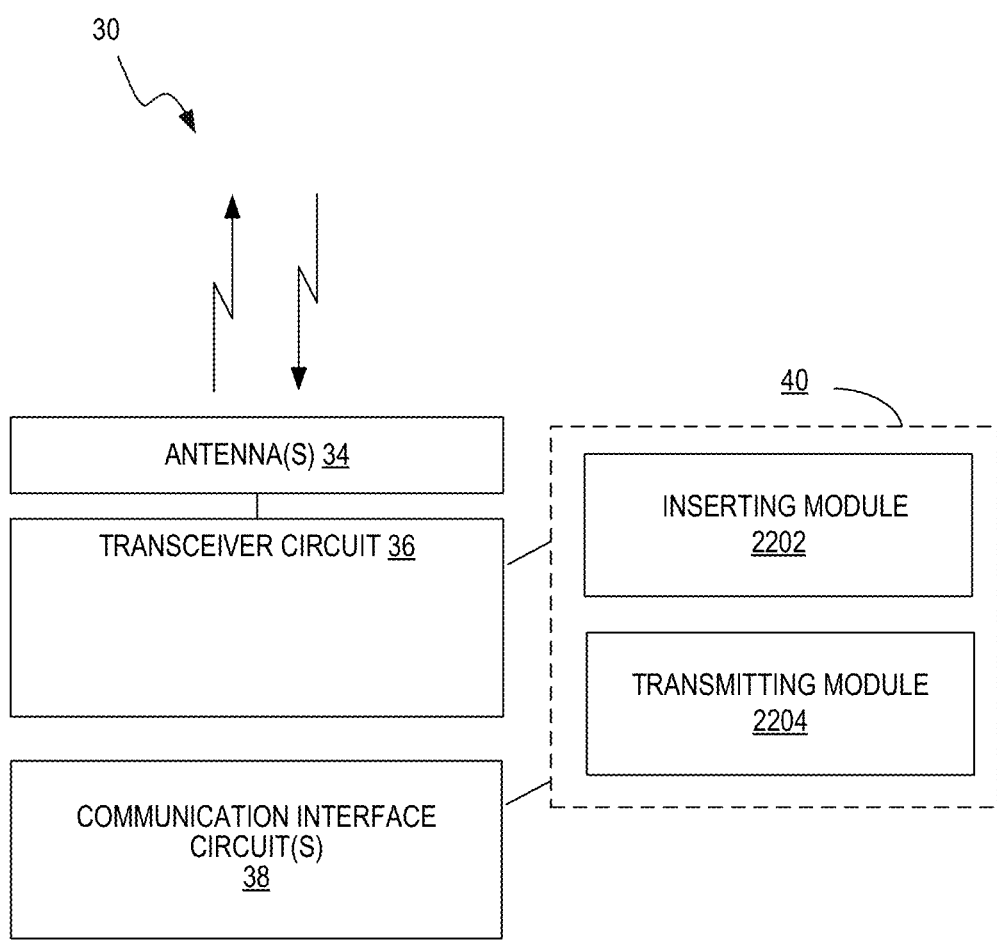
FIG. 22 illustrates a functional implementation of a network access node for sending synchronization information, according to some embodiments.

FIG. 22 illustrates an example functional module or circuit architecture as may be implemented in the access network node 30, e.g., based on the synchronization circuitry 40. The illustrated embodiment at least functionally includes an inserting module 2202 for inserting the location information in a time synchronization IE. The method further includes a transmitting module 2204 for transmitting the time synchronization IE to at least one other device.

Figure 23:
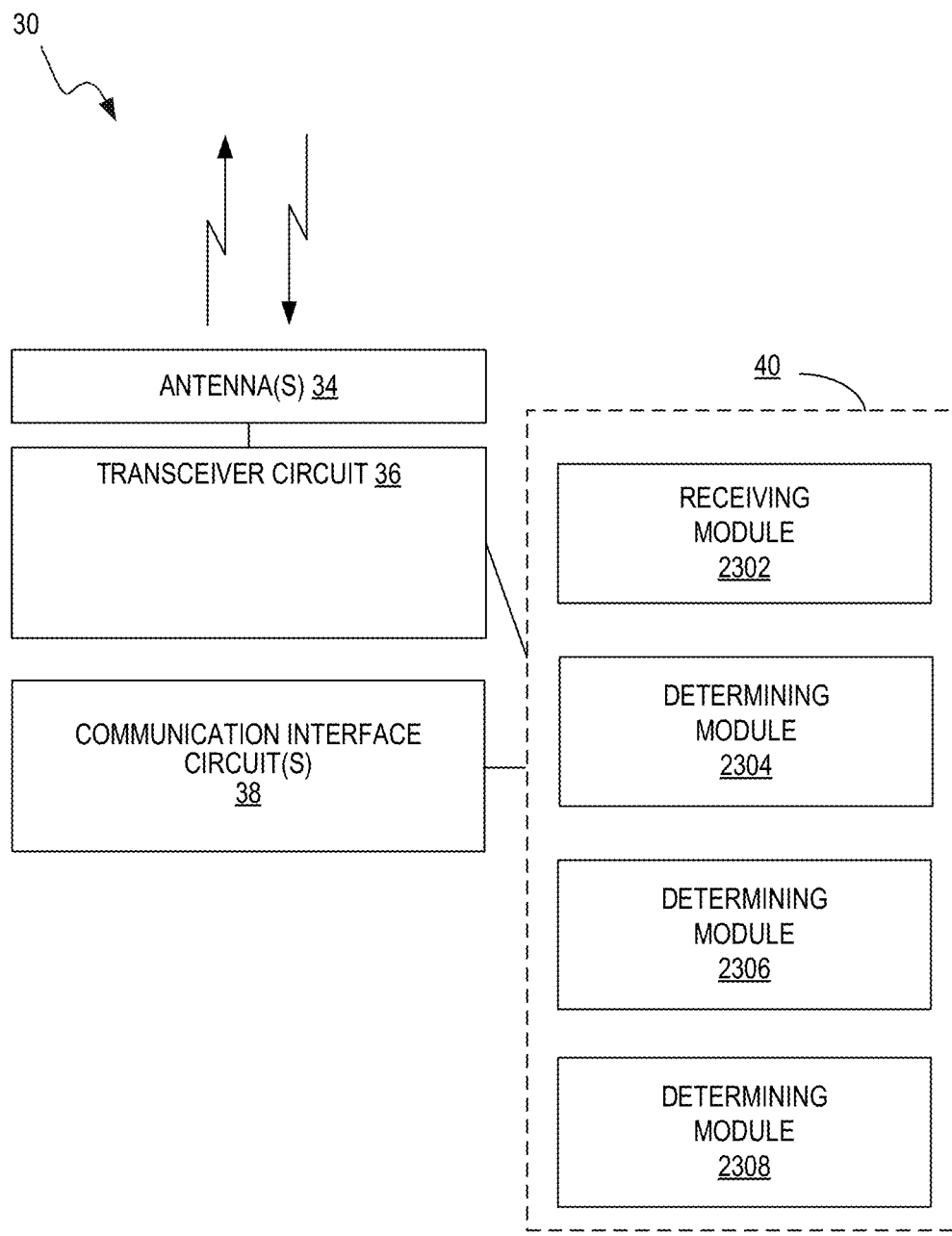
FIG. 23 illustrates a functional implementation of a network access node for performing over-the-air synchronization, according to some embodiments.

FIG. 23 illustrates an example functional module or circuit architecture as may be implemented in the access network node 30, e.g., based on the synchronization circuitry 40. The illustrated embodiment at least functionally includes a receiving module 2302 for receiving location information for a transmission point associated with one or more cells, from another device, in an IE indicating a location for the transmission point. The embodiment also includes a determining module 2304 for determining two or more transmission point locations from the location information. The embodiment includes a determining module 2306 for determining an estimated location for the transmission point and an accuracy for the estimated location based on the two or more transmission point locations. The embodiment also includes a determining module 2308 for determining synchronization timing for transmissions by the first device, based on a synchronization signal received from the transmitter, the estimated location, and the accuracy.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a first device in a wireless communication network, for receiving synchronization information from a second device in the wireless communication network, the method comprising:
- transmitting a request for transmitter location information in a self-organizing network (SON) information request information element (IE);
- receiving transmitter location information corresponding to the request, from the second device, in an IE indicating a location for each of one or more transmitters that provide synchronization signals;
- determining one or more propagation delays of a synchronization signal received from a transmitter, based on transmitter location information received for the transmitter in the IE; and
- using the determined one or more propagation delays to compensate for a timing difference between the first device and the transmitter of the synchronization signal.

2. The method of claim 1, wherein the transmitter location information comprises accuracy information indicating an accuracy of the transmitter location information, and wherein the method further comprises determining the one or more propagation delays based on the accuracy information.

3. The method of claim 1, wherein the transmitter location information comprises information indicating whether a cell served by the transmitter is also served by multiple transmitters, and wherein the method further comprises determining the one or more propagation delays based on an average of propagations delays from the multiple transmitters.

4. The method of claim 1, wherein the transmitter location information comprises cell information indicating one or more cells served by each transmitter, and wherein the method further comprises identifying a cell whose synchronization reference signal is transmitted from the transmitter based on the cell information.

5. A method, in a first device in a wireless communication network, for sending synchronization information to other devices in the wireless communication network, comprising:
- determining transmitter location information indicating a location for each of one or more transmitters that provide synchronization signals;
- inserting the transmitter location information in a time synchronization information element (IE); and
- transmitting the time synchronization IE to at least one other device.

6. The method of claim 5, wherein the first device is a network node and the at least one other device is a radio node, wherein inserting comprises inserting the transmitter location information in the time synchronization IE, and wherein transmitting comprises transmitting the time synchronization IE over an interface.

7. The method of claim 6, wherein the first device is a first radio node and the at least one other device is a second radio node, wherein inserting comprises inserting the transmitter location information in a served cell IE and wherein transmitting comprises transmitting the served cell IE over an interface between the first and second radio nodes.

8. The method of claim 5, wherein the transmitter location information comprises accuracy information indicating an accuracy of the transmitter location information.

9. The method of claim 5, wherein the transmitter location information indicates whether a cell served by a transmitter is also served by multiple transmitters.

10. The method of claim 5, wherein the transmitter location information comprises cell information indicating one or more cells served by each transmitter.

11. The method of claim 5, wherein determining transmitter location information comprises acquiring synchronization target distance information pertaining to the transmitter location information from a network node or one or more radio nodes.

12. A network device in a wireless communication network, configured to receive synchronization information from another device in the wireless communication network, the network device comprising a processing circuit configured to:
- transmit a request for transmitter location information in a self-organizing network (SON) information request information element (IE);
- receive transmitter location information that corresponds to the request, from the other device, in an IE indicating a location for each of one or more transmitters that provide synchronization signals;
- determine one or more propagation delays of a synchronization signal received from a transmitter based on transmitter location information received for the transmitter in the IE; and
- use the determined one or more propagation delays to compensate for a timing difference between the network device and a transmitter of the synchronization signal.

13. The network device of claim 12, wherein the transmitter location information comprises accuracy information indicating an accuracy of the transmitter location information, and wherein the processing circuit is configured to determine the one or more propagation delays based on the accuracy information.

14. The network device of claim 12, wherein the transmitter location information comprises information indicating whether a cell served by the transmitter is also served by other transmitters, and wherein the processing circuit is configured to determine the one or more propagation delays based on an average of propagations delays from the multiple transmitters.

15. The network device of claim 12, wherein the transmitter location information comprises cell information indicating one or more cells served by each transmitter, and wherein the processing circuit is configured to identify a cell whose synchronization reference signal is transmitted from the transmitter based on the cell information.

16. A network device in a wireless communication network, configured to send synchronization information to other devices in the wireless communication network, comprising a processing circuit configured to:
   determine transmitter location information indicating a location for each of one or more transmitters that provide synchronization signals;
   insert the transmitter location information in a time synchronization information element (IE); and
   transmit the time synchronization IE to at least one other device.

17. The network device of claim 16, wherein the network device is a network node and the at least one other device is a radio node, wherein the processing circuit is configured to insert the transmitter location information in the time synchronization IE and transmit the time synchronization IE over an interface.

18. The network device of claim 17, wherein the network device is a first radio node and the at least one other device is a second radio node, wherein the processing circuit is configured to insert the transmitter location information in a served cell IE and transmit the served cell IE over an interface between the first and second radio nodes.

19. The network device of claim 16, wherein the transmitter location information comprises accuracy information indicating an accuracy of the transmitter location information.

20. The network device of claim 16, wherein the transmitter location information indicates whether a cell served by a transmitter is also served by multiple transmitters.

21. The network device of claim 16, wherein the transmitter location information comprises cell information indicating one or more cells served by each transmitter.

22. The network device of claim 16, wherein the processing circuit is configured to acquire synchronization target distance information pertaining to the transmitter location information from a network node or one or more radio nodes.

23. A non-transitory computer-readable storage medium storing a computer program for sending synchronization information, the computer program comprising program instructions that, when executed on a processing circuit of a network device, cause the processing circuit to:
   determine transmitter location information indicating a location for each of one or more transmitters that provide synchronization signals;
   insert the transmitter location information in a time synchronization information element (IE); and
   transmit the time synchronization IE to at least one other device.

24. A non-transitory computer readable storage medium storing a computer program for receiving synchronization information, the computer program comprising program instructions that, when executed on a processing circuit of a network device, cause the processing circuit to:
   transmit a request for transmitter location information in a self-organizing network (SON) information request information element (IE);
   receive transmitter location information that corresponds to the request, from another device, in an IE indicating a location for each of one or more transmitters that provide synchronization signals;
   determine one or more propagation delays of a synchronization signal received from a transmitter based on transmitter location information received for the transmitter in the IE; and
   use the determined one or more propagation delays to compensate for a timing difference between the network device and a transmitter of the synchronization signal.

* * * * *